US009648335B2

(12) United States Patent
Rapaka et al.

(10) Patent No.: US 9,648,335 B2
(45) Date of Patent: May 9, 2017

(54) BITSTREAM RESTRICTIONS ON PICTURE PARTITIONS ACROSS LAYERS

(71) Applicant: QUALCOMM Incorporated, San Diego, CA (US)

(72) Inventors: Krishnakanth Rapaka, San Diego, CA (US); Ye-Kui Wang, San Diego, CA (US); Adarsh Krishnan Ramasubramonian, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 14/328,317

(22) Filed: Jul. 10, 2014

(65) Prior Publication Data

US 2015/0016543 A1    Jan. 15, 2015

Related U.S. Application Data

(60) Provisional application No. 61/845,928, filed on Jul. 12, 2013.

(51) Int. Cl.
| H04B 1/66 | (2006.01) |
| H04N 19/30 | (2014.01) |
| H04N 19/597 | (2014.01) |
| H04N 19/70 | (2014.01) |
| H04N 19/436 | (2014.01) |

(52) U.S. Cl.
CPC ........... *H04N 19/30* (2014.11); *H04N 19/597* (2014.11); *H04N 19/70* (2014.11); *H04N 19/436* (2014.11)

(58) Field of Classification Search
CPC ....... H04N 19/30; H04N 19/597; H04N 19/70
See application file for complete search history.

(56) References Cited

U.S. PATENT DOCUMENTS

| 2014/0086330 A1* | 3/2014 | Zhou ................ H04N 19/00545 |
| | | 375/240.24 |
| 2015/0172688 A1* | 6/2015 | Maeda ................ H04N 19/436 |
| | | 375/240.26 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.

(Continued)

*Primary Examiner* — Tat Chio
(74) *Attorney, Agent, or Firm* — Shumaker & Sieffert, P.A.

(57) ABSTRACT

Bitstream restrictions or constraints on the partitioning of pictures across layers of video data are described. In some examples, the number of tiles per picture for each layer of a plurality of layers is constrained based on a maximum number of tiles per picture for the layer. In some examples, the number of tiles per picture for each layer of the plurality of layers is no greater than the maximum number of tiles per picture for the layer. In some examples, a sum of the numbers of tiles per picture for the plurality of layers is no greater than a sum of the maximum numbers of tiles per picture for the plurality of layers. In some examples, a second largest coding unit (LCU) or coding tree block (CTB) size for a second layer is constrained based on, e.g., to be equal to, a first LCU size for a first layer.

42 Claims, 19 Drawing Sheets

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Deshpande et al., "On Tile Alignment", JCT-VC Meeting;Vienna; (Joint Collaborative Team on Video Coding of ISO/IEC JTC1/SC29/WG11 and ITU-T SG.16), No. JCTVC-N0199-v3, Jul. 25-Aug. 2, 2013; XP030114695, 7 pp.
Rapaka, et al., "MV-HEVC/SHVC HLS: Bitstream restrictions on tiles and wavefonts across layers," JCT-3V Meeting; Jul. 25-Aug. 2, 2013; Vienna; (Joint Collaborative Team on 3D Video Coding Extension Development of ISO/IEC JTC1/SC29/WG11 and ITU-T SG.16); URL: http://phenix.int-evry.fr/jct2/, No. JCT3V-E0070, XP030131073, 4 pp.
Sullivan, "The Arrival of the High Efficiency Video Coding Standard (HEVC)", Data Compression Conference, DCC 2013, Mar. 20, 2013; XP055149924, Snowbird, UT, USA, 7 pp.
Sullivan, et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 12, 2012, XP011487803, pp. 1649-1668.
Chen, et al., "SHVC Draft Text 1", Joint Collaborative Team on Video Coding (JCT-VC) of ITU-T SG16 WP3 and ISO/IEC JTC1/SC29/WG11, 12th Meeting: Geneva, CH, JCTVC-L1008, Jan. 14-23, 2013, pp. 1-34.
Tech, et al., "3D-HEVC Test Model 4", JCT-3V Meeting; Incheon; (The Joint Collaborative Team on 3D Video Coding Extension Development of ISO/IEC JTC1/SC29/WG11 and ITU-T SG.16), No. JCT3V-D1005, Jun. 17, 2013, XP030130998, 88 pp.
Tech, et al., "MV-HEVC Draft Text 3 (ISO/IEC 23008-2:201x/PDAM2)", Joint Collaborative Team on 3D Video Coding Extension Development of ITU-T SG 16 WP 3 and ISO/IEC JTC 1/SC 29/WG 11, 3rd Meeting: Geneva, CH, JCT3V-C1004_d3, Jan. 17-23, 2013; 34 pp.
Bross, et al., "Editors' Proposed Corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 2013, 309 pp.
Tech, et al., "MV-HEVC Draft Text 4-JCT3V-D1004 v4", Joint Collaborative Team on 3D Video Coding Extension Development of ITU-T SG 16 WP 3 and ISO/IEC JTC 1/SC 29/WG 11; 4th Meeting: Incheon, vol. JCT3V-D1004 v4, Apr. 20-26, 2013; XP055141490, 62 pp.
Chen, et al., "SHVC Test Model 2 (SHM 2)," Joint Collaborative Team on 3D Video Coding Extension Development of ITU-T SG 16 WP 3 and ISO/IEC JTC 1/SC 29/WG 11; Document: JCTVC-M1007_v1, Apr. 18-26, 2013, 45 pp.
Wan, et al., "Adding a Level Restriction on Coding Tree Block Size," Joint Collaborative Team on 3D Video Coding Extension Development of ITU-T SG 16 WP 3 and ISO/IEC JTC 1/SC 29/WG 11; Document: JCTVC-J0334, Jul. 11-20, 2012, 3 pp.
International Search Report and Written Opinion from International Application No. PCT/US2014/046370, dated Jan. 20, 2015, 15 pp.
Response to Written Opinion dated Jan. 20, 2015, from International Application No. PCT/US2014/046370, filed on Apr. 23, 2015, 4 pp.
Second Written Opinion from International Application No. PCT/US2014/046370, dated Jun. 8, 2015, 7 pp.
Response to Second Written Opinion dated Jun. 8, 2015, from International Application No. PCT/US2014/046370, filed on Aug. 7, 2015, 4 pp.
International Preliminary Report on Patentability from International Application No. PCT/US2014/046370, dated Sep. 24, 2015, 9 pp.
Partial Search Report from International Application No. PCT/US2014/046370, dated Nov. 6, 2014, 6 pp.
Rapaka, et al., "MV-HEVC/SHVC HLS: On early indication of parallel processing tools in HEVC extensions", JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0081, Oct. 15, 2013, XP030131489, 2 pp.
Tech, et al., "MV-HEVC Draft Text 5," Jul. 27-Aug. 2, 2013; (The Joint Collaborative Team on 3D Video Coding Extension Development of ISO/IEC JTC1/SC29/WG11 and ITU-T SG.16); Document: JCT3V-E1004_v6, Aug. 7, 2013, 65 pp.
Wang, et al., "High Efficiency Video Coding (HEVC) Defect Report," Jul. 25-Aug. 2, 2013; (The Joint Collaborative Team on 3D Video Coding Extension Development of ISO/IEC JTC1/SC29/WG11 and ITU-T SG.16); Sep. 27, 2013; Document: JCTVC-N1003_v1, 311 pp.
Chen, et al., "High efficiency video coding (HEVC) scalable extension draft 3," Jul. 25-Aug. 2, 2013; (The Joint Collaborative Team on 3D Video Coding Extension Development of ISO/IEC JTC1/SC29/WG11 and ITU-T SG.16); Document: JCTVC-N1008_v3, Sep. 16, 2013, 68 pp.
Flynn, et al., "High Efficiency Video Coding (HEVC) Range Extensions text specification: Draft 4," Apr. 18-26, 2013; (The Joint Collaborative Team on 3D Video Coding Extension Development of ISO/IEC JTC1/SC29/WG11 and ITU-T SG.16); Aug. 8, 2013; Document: JCTVC-N1005_v1, 332 pp.
Tech, et al., "3D-HEVC Test Model 4", JCT-3V Meeting; Incheon; (The Joint Collaborative Team on 3D Video Coding Extension Development of ISO/IEC JTC1/SC29/WG11 and ITU-T SG.16), No. JCT3VJ1005, Jun. 17, 2013, 88 pp., XP030130998.
Tech, et al., "MV-HEVC Draft Text 3 (ISO/IEC 23008-2:201x/PDAM2)", Joint Collaborative Team on 3D Video Coding Extension Development of ITU-T SG 16 WP 3 and ISO/IEC JTC 1/SC 29/WG 11, 3rd Meeting: Geneva, CH, JCT3V-C1004_d3, Jan. 17-23, 2013, 34 pp.
European Search Report—EP16194662.9—Search Authority—The Hague—Feb. 24, 2017 (1212-631EP02/133968EPD1) (9 pages).
Lasserre S., et al., "Description of the Scalable Video Coding Technology Proposal by Canon Research Centre France," 11. JCT-VC Meeting; 102. MPEG Meeting; Oct. 10, 2012-Oct. 19, 2012; Shanghai; (Joint Collaborative Team on Video Coding of ISO/IEC

(56) References Cited

OTHER PUBLICATIONS

JTC1/SC29NVG11 and ITU-T SG.16); URL: http://wftp3.itu.int/av-arch/jctvc-site/, No. JCTVC-K0041, Oct. 1, 2012, XP030112973, 78 pages.

Schwarz H., et al., "Description of Scalable Video Coding Technology Proposal by Fraunhofer HHI (Configuration 8)," 11, JCT-VC Meeting; 102, MPEG Meeting; Oct. 10, 2012-Oct. 19, 2012; Shanghai; (Joint Collaborative Team on Video Coding of ISO/IEC JTC1/SC29/WG11 and ITU-T Sg.16 ), No. JCTVC-K0043, Oct. 2, 2012 (Oct. 2, 2012), XP030112975, 36 pages.

Yamamoto T., et al., "MV-HEVC/SHVC HLS: On Support of Different Luma CTB Sizes for Different Layers," 15, JCT-VC Meeting; Oct. 23, 2013-Nov. 1, 2013; Geneva; (Joint Collaborative Team on Video Coding of ISO/IEC JTC1/SC29/WG11 and ITU-T SG.16 ), No. JCTVC-O0057, Oct. 24, 2013 (Oct. 24, 2013). XP030115030, 3 pages.

\* cited by examiner

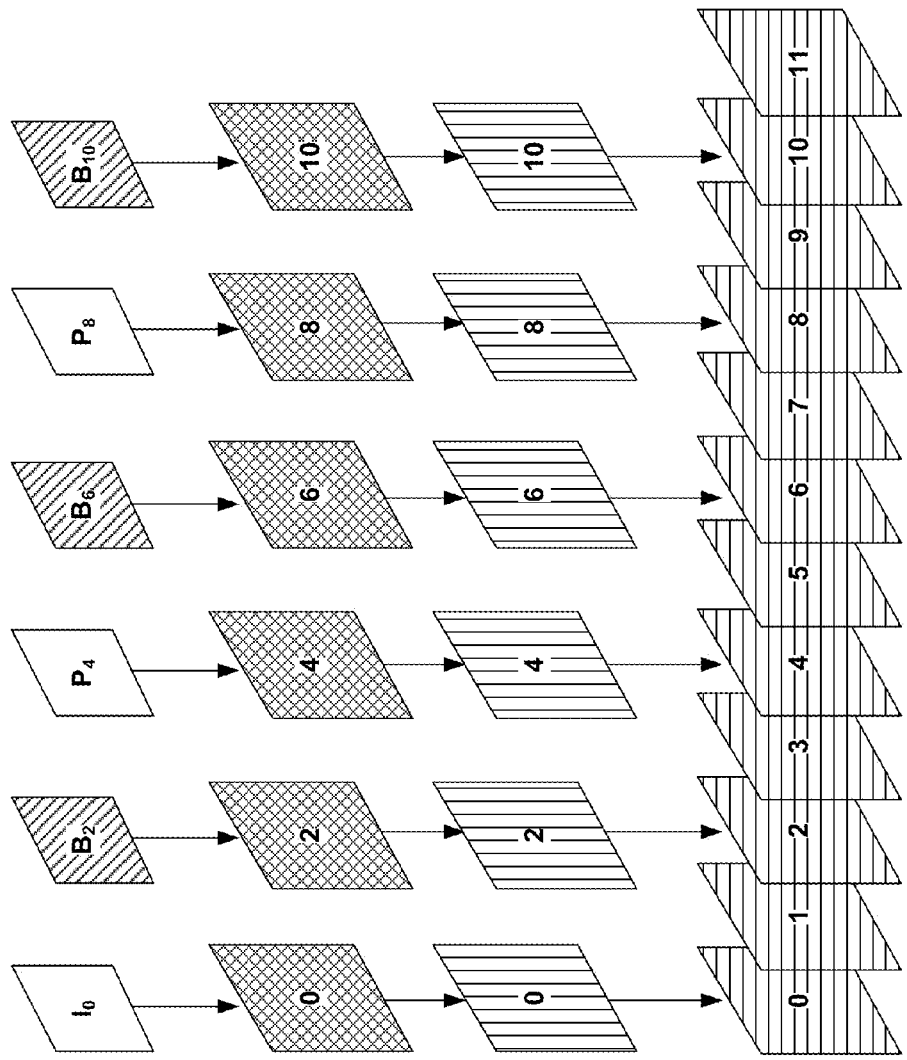
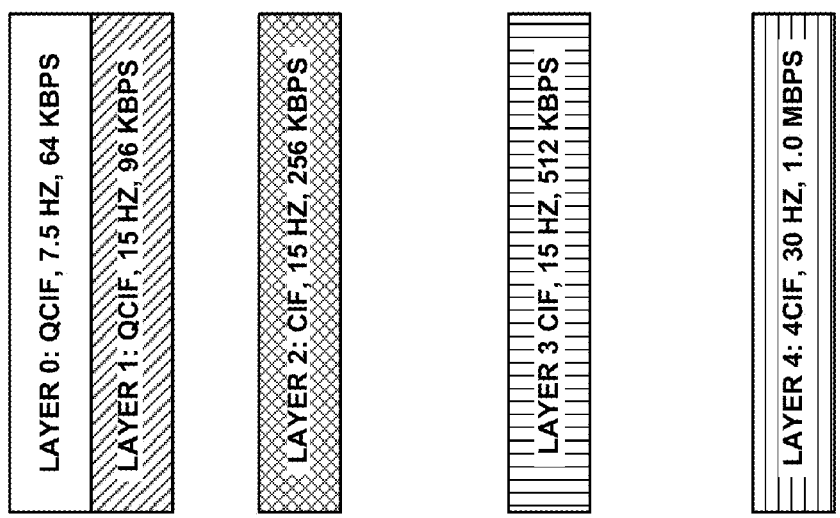
FIG. 3

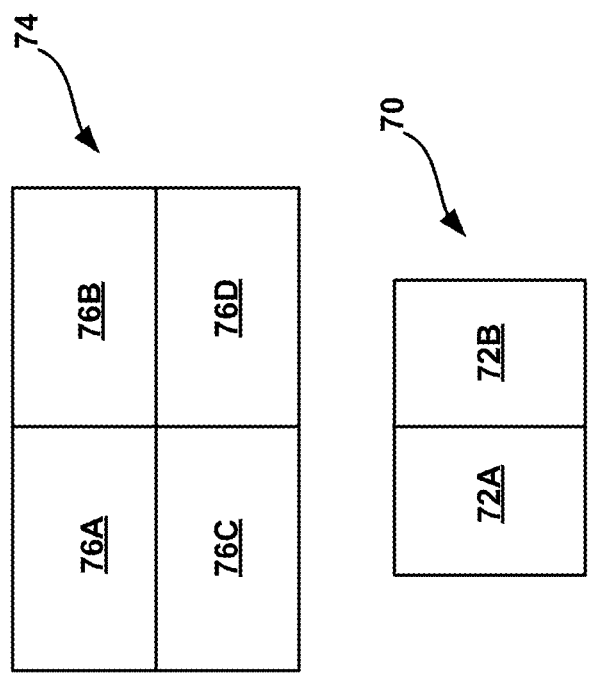
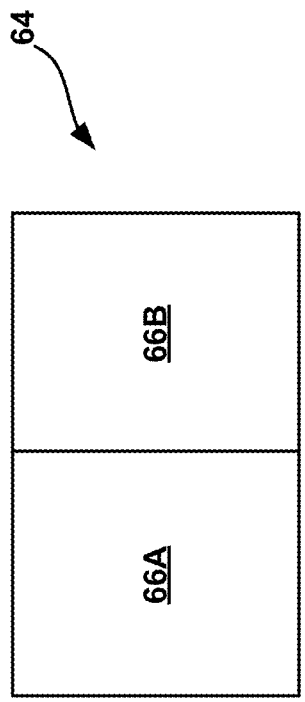
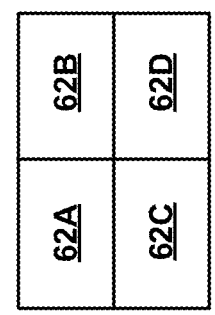
FIG. 9B
FIG. 9A

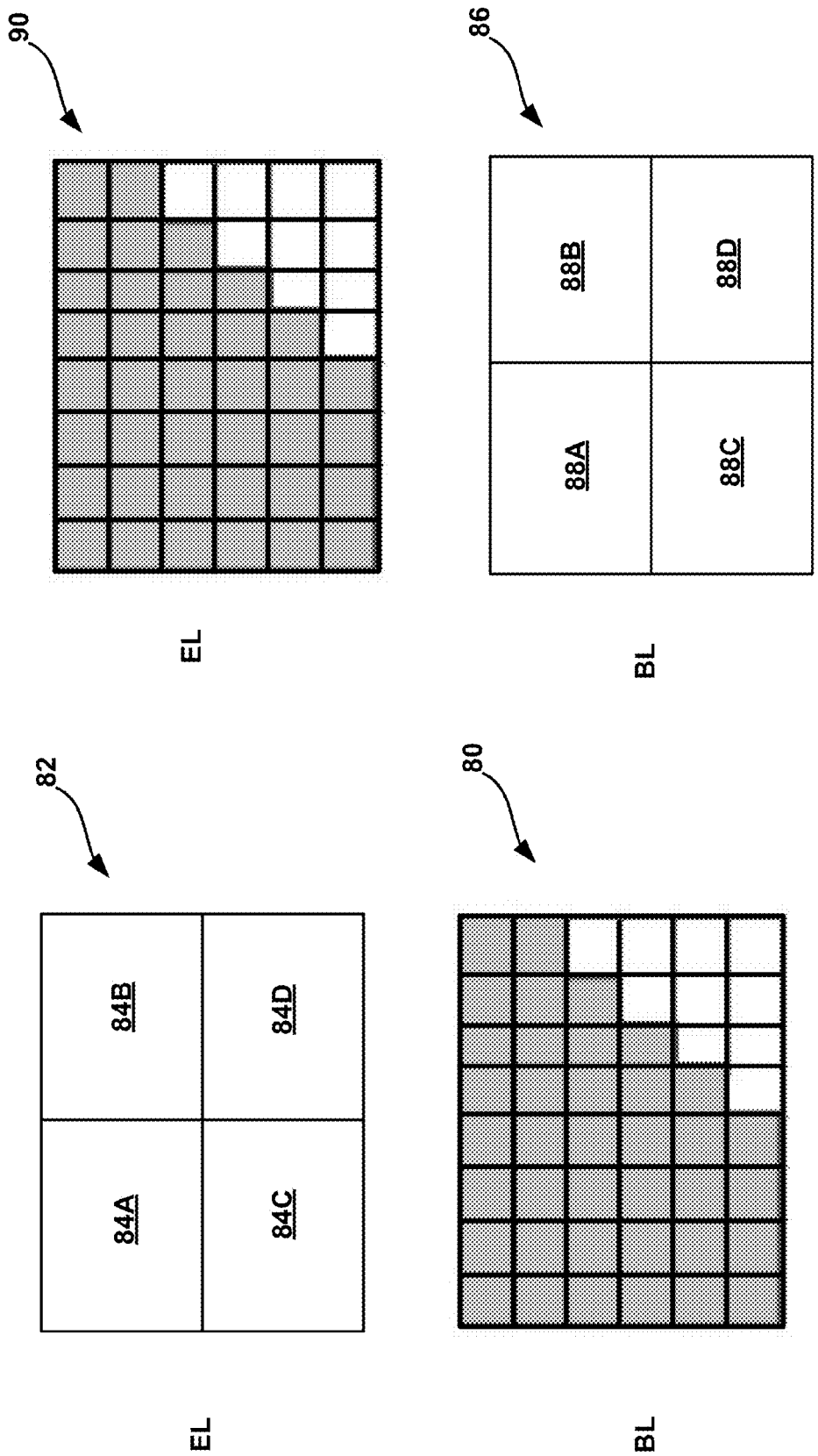

BITSTREAM RESTRICTIONS ON PICTURE PARTITIONS ACROSS LAYERS

This application claims the benefit of U.S. Provisional Application Ser. No. 61/845,928, filed Jul. 12, 2013, the entire content of which is incorporated herein by reference.

TECHNICAL FIELD

This disclosure is related to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.2641 MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Bitstream restrictions or constraints on the partitioning of pictures across layers of video data are described. In some examples, the number of tiles for each layer of a plurality of layers is constrained based on a maximum number of tiles for the layer. The maximum number of tiles for the layer may be determined based on a spatial resolution for the picture in the layer. In some examples, the number of tiles for each layer of the plurality of layers is no greater than the maximum number of tiles for the layer. In some examples, a sum of the numbers of tiles for the plurality of layers is no greater than a sum of the maximum numbers of tiles for the plurality of layers.

In some examples, a second largest coding unit (LCU) size for a second layer is constrained based on a first LCU size for a first layer. An LCU may also be referred to as a coding tree block (CTB). In some examples, the second LCU size for the second layer is constrained to be equal to the first LCU size. In some examples, the second layer is an active reference layer for the first layer, e.g., for signal-to-noise (SNR) scalability.

The bitstream restrictions described herein may, in some examples, facilitate more efficient, evenly distributed, and synchronized parallel processing of video data including a plurality of layers. The bitstream restrictions described herein may also, in some examples, facilitate simplified pipelining design and implementation of parallel processing in a video codec. The bitstream restrictions described herein may also, in some examples, facilitate easier mapping of co-located coding units across different layers, e.g., for inter-layer prediction or filtering. The bitstream restrictions described herein may also, in some examples, facilitate more flexible use of tiles across different layers.

In one example method of decoding video data comprising a plurality of layers comprises decoding respective syntax information for each layer of the plurality of layers of the video data. The respective syntax information for each layer of the plurality of layers defines partitioning of a picture in the layer into a number of tiles per picture for the layer. The syntax information is constrained such that the number of tiles per picture for each layer of the plurality of layers is determined based on a maximum number of tiles per picture for the layer. The maximum number of tiles for the layer is determined based on at least one of a spatial resolution, tier information, or level information for the picture in the layer. The method further comprises reconstructing the picture in the at least one layer based on the partitioning of the picture into the number of tiles per picture for the layer defined by the decoded syntax information.

In another example, a method of encoding video data comprising a plurality of layers comprises partitioning a picture in each layer of the plurality of layers of the video data into a number of tiles per picture for the layer. Partitioning the picture into the number of tiles per picture for the layer comprises determining a maximum number of tiles per picture for the layer based on at least one of a spatial resolution, tier information, or level information for the picture in the layer, and constraining the number of tiles per picture for the layer based on the maximum number of tiles per picture for the layer. The method further comprises encoding the picture in each layer of the plurality of layers based on the partitioning of the picture into the number of tiles per picture for the layer, and encoding respective syntax information for each layer of the plurality of layers of the video data. The respective syntax information for each layer of the plurality of layers defines the partitioning of the picture in the layer into the number of tiles per picture for the layer.

In another example, an apparatus comprises a video decoder configured decode video data comprising a plurality of layers. The video decoder comprises a memory configured to store an encoded video bitstream that encodes the video data, and one or more processors. The one or more processors are configured to decode respective syntax information for each layer of the plurality of layers of the video data from the encoded video bitstream. The respective syntax information for each layer of the plurality of layers defines partitioning of a picture in the layer into a number of tiles per picture for the layer. The syntax information is constrained such that the number of tiles per picture for each layer of the plurality of layers is determined based on a maximum number of tiles per picture for the layer. The maximum number of tiles per picture for the layer is determined based on at least one of a spatial resolution, tier information, or level information for the picture in the layer. The one or more processors are further configured to reconstruct the picture in the at least one layer based on the partitioning of the picture into the number of tiles per picture for the layer defined by the decoded syntax information.

In another example, an apparatus comprises a video encoder configured encode video data comprising a plurality of layers. The video encoder comprises a memory configured to store an encoded video bitstream that encodes the video data, and one or more processors. The one or more processors are configured to partition a picture in each layer of the plurality of layers of the video data into a number of tiles per picture for the layer. To partition the picture into the number of tiles per picture for the layer, the one or more processors are configured to determine a maximum number of tiles per picture for the layer based on at least one of a spatial resolution, tier information, or level information for the picture in the layer, and constrain the number of tiles per picture for the layer based on the maximum number of tiles per picture for the layer. The one or more processors are further configured to encode, into the encoded video bitstream, the picture in each layer of the plurality of layers based on the partitioning of the picture into the number of tiles per picture for the layer, and encode, into the encoded video bitstream, respective syntax information for each layer of the plurality of layers of the video data, the respective syntax information for each layer of the plurality of layers defining the partitioning of the picture in the layer into the number of tiles per picture for the layer.

In another example, an apparatus configured to code video data comprising a plurality of layers comprises means for coding respective syntax information for each layer of the plurality of layers of the video data. The respective syntax information for each layer of the plurality of layers defines partitioning of a picture in the layer into a number of tiles per picture for the layer. The syntax information is constrained such that the number of tiles per picture for each layer of the plurality of layers is determined based on a maximum number of tiles per picture for the layer. The maximum number of tiles for the layer is determined based on at least one of a spatial resolution, tier information, or level information for the picture in the layer. The apparatus further comprises means for processing the picture in the at least one layer based on the partitioning of the picture into the number of tiles per picture for the layer defined by the coded syntax information.

In another example, a computer-readable storage medium has instructions stored thereon that when executed cause one or more processors of a video coder to code respective syntax information for each layer of the plurality of layers of the video data. The respective syntax information for each layer of the plurality of layers defines partitioning of a picture in the layer into a number of tiles per picture for the layer. The syntax information is constrained such that the number of tiles per picture for each layer of the plurality of layers is determined based on a maximum number of tiles per picture for the layer. The maximum number of tiles per picture for the layer is determined based on at least one of a spatial resolution, tier information, or level information for the picture in the layer. The instructions further cause the one or more processors to process the picture in the at least one layer based on the partitioning of the picture into the number of tiles per picture for the layer defined by the coded syntax information.

In another example, an apparatus comprises a video coder configured code video data comprising a plurality of layers. The video coder comprises a memory configured to store an encoded video bitstream that encodes the video data, and one or more processors. The one or more processors are configured to code first syntax information specifying a first largest coding unit (LCU) size for a first layer of the video data and second syntax information specifying a second LCU size for a second layer of the video data. The first and second syntax information are encoded in the encoded video bitstream. The second LCU size is constrained based on the first LCU size. The one or more processors are further configured to process pictures in the first and second layers of the video data according to the first and second LCU sizes for the first and second layers of the video data.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating an example of the SVC coding structure.

FIGS. 9A and 9B are conceptual diagrams illustrating different layers of video data having different numbers of tiles.

FIGS. 10A and 10B are conceptual diagrams illustrating co-existence of tiles and WPP across different layers of video data.

DETAILED DESCRIPTION

Figure 1:
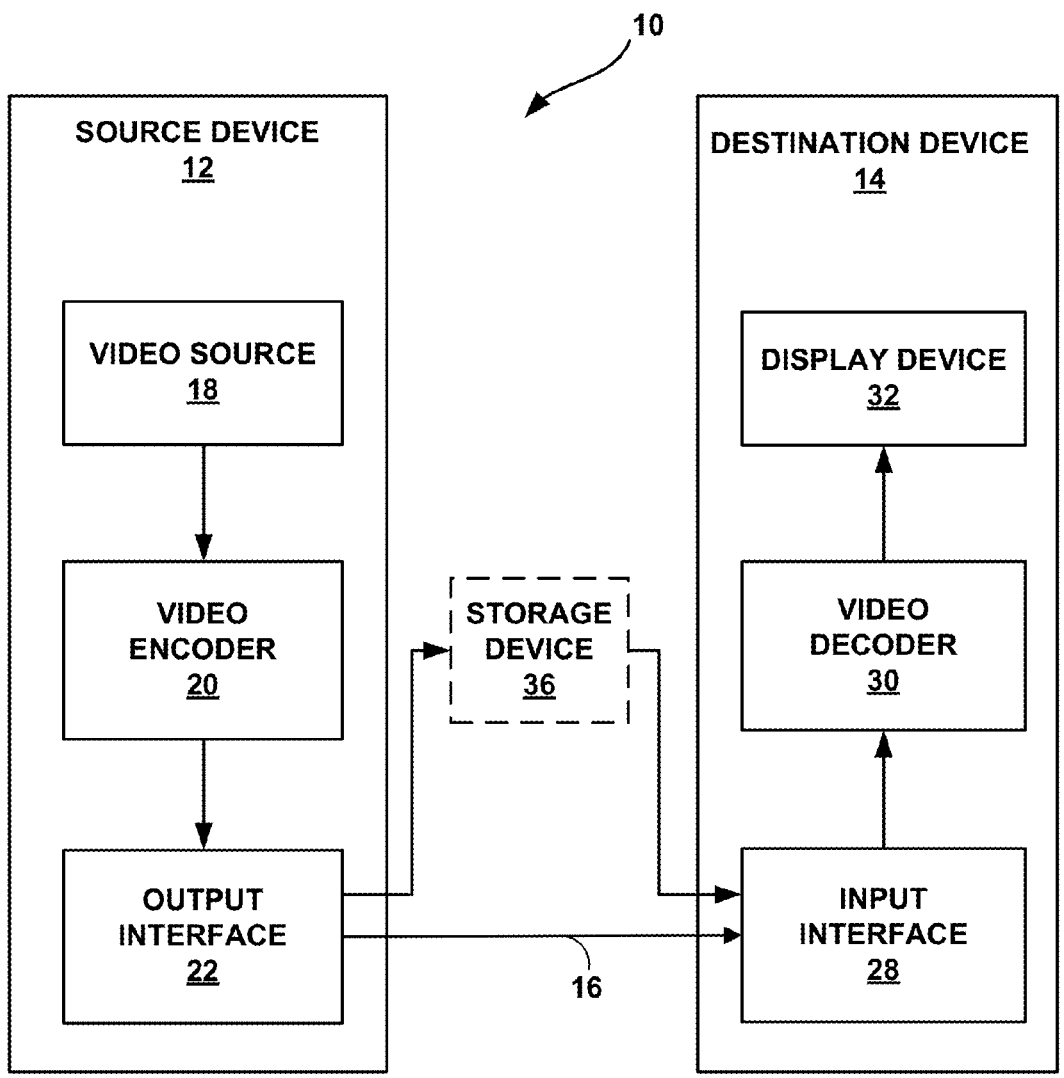
FIG. 1 is a block diagram illustrating an example video encoding and decoding system that may utilize the techniques described in this disclosure.

In general, this disclosure describes techniques for coding video data comprising a plurality of layers. In some examples, video coders may apply the techniques of this disclosure for coding a plurality of layers for scalable video coding. In some examples, video coders may apply the techniques of this disclosure for coding a plurality of layers that comprise a plurality of views of multiview video data during multiview video coding (with or without depth). In some examples, the multiview coding may include coding of three-dimensional, or 3D, video, and may be referred to as 3D video coding. The techniques of this disclosure may be applicable to any coding of video data including two or more layers, or codecs for coding such video data.

More particularly, this disclosure relates to bitstream restrictions or constraints on the partitioning of pictures, such as into largest coding units (LCUs) or tiles, and/or on picture processing techniques, such as wavefront parallel processing (WPP), across layers of video data. In some examples, a video coder codes, e.g., a video encoder encodes or a video decoder decodes, a bitstream that is constrained, e.g., codes syntax information in the bitstream that is constrained, such that a first layer, e.g., base layer, may not include a greater number of tiles per picture than a second layer that uses the first layer as a reference layer, e.g., extension layer. In some examples, a video coder codes a bitstream, e.g., syntax information in the bitstream, that is constrained such that, if one of tiles or WPP is enabled for a first layer, the other of tiles or WPP may not be enabled for a second layer. Again, the first layer may be a reference layer, e.g., base layer, for the second layer, which may be an extension layer.

In some examples, a video coder codes bitstream that is constrained such that filtering across tile boundaries, e.g., loop filtering, is either allowed or disallowed for a plurality, e.g., all, of the layers in the video data. In some examples, a video coder codes a bitstream that is constrained such that a given layer must have the same LCU size as any of its one or more active reference layers, e.g., for SNR scalability. LCUs may also be referred to as a coding tree blocks (CTBs) or treeblocks.

In some examples, a video coder codes a bitstream that is constrained such that the number of tiles per picture for each layer is constrained based on a maximum number of tiles per picture for the layer. The maximum number of tiles per picture for the layer may be determined, e.g., by a video encoder, based on a spatial resolution, or tier and level information, for the picture in the layer. In some examples, the number of tiles for each layer of the plurality of layers is no greater than the maximum number of tiles for the layer. In some examples, a sum of the numbers of tiles for the plurality of layers is no greater than a sum of the maximum numbers of tiles for the plurality of layers.

The bitstream restrictions described herein may, in some examples, facilitate more efficient, evenly distributed, and synchronized, parallel processing of video data including a plurality of layers. The bitstream restrictions described herein may also, in some examples, facilitate simplified pipelining design and implementation of parallel processing in a video codec. The bitstream restrictions described herein may also, in some examples, facilitate easier mapping of co-located coding units across different layers, e.g., for inter-layer prediction or filtering. The bitstream restrictions described herein may also, in some examples, facilitate more flexible use of tiles across different layers.

Bitstream restrictions or constraints may be defined by a video coding standard. In such cases, a video bitstream that conforms to the standard must be restricted or constrained as defined in the standard. Furthermore, to encode video data according to the standard, a video encoder encodes a video bitstream that is restricted or constrained as defined by the standard, and thus conforms to the standard. A video decoder configured to decode video data according to the standard will be configured to decode a video bitstream that is restricted or constrained as defined by the standard, and may not accurately decode a video bitstream that is not restricted or constrained according to the standard.

The techniques described herein may be used in conjunction with one or more video coding standards. Example, video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, Mar. 2010.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). A draft of the HEVC specification is available from: http://phenix.int-evry.fr/jct/doc_end_user/documents/12_Geneva/wg11/JCTVC-L1003-v34.zip. The full-text citation for the above-referenced draft of the HEVC specification is Bross et al., "High Efficiency Video Coding (HEVC) text specification draft 10 (for FDIS & Last Call), JCT-VC of ITU-T SG 16 WP 3 and ISO/IEC JTC 1/SC 29/WG 11, 12 Meeting: Geneva, CH, 14-23 Jan. 2013.

The scalable extension to HEVC, named SHVC, is being developed by the JCT-VC. A recent Working Draft (WD) of SHVC, referred to as SHVC WD1 hereinafter, is available from: http://phenix.int-evry.fr/jct/doc_end_user/documents/12_Geneva/wg11/JCTVC-L1008-v1.zip. A test model description of SHVC is available from: http://phenix.int-evry.fr/jct/doc_end_user/documents/12_Geneva/wg11/JCTVC-M007-v3.zip.

The multiview extension to HEVC, namely MV-HEVC, is also being developed by the JCT-3V. A recent Working Draft (WD) of MV-HEVC, referred to as MV-HEVC WD3 hereinafter, is available from: http://phenix.it-sudparis.eu/jct2/doc_end_user/documents/3_Geneva/wg11/JCT3V-C1004-v4.zip.

Currently, a Joint Collaboration Team on 3D Video Coding (JCT-3C) of VCEG and MPEG is developing a 3DV standard based on HEVC, for which part of the standardization efforts includes the standardization of MV-HEVC, and another part of the standardization efforts includes the standardization of 3D Video coding (3DV) based on HEVC (3D-HEVC). For 3D-HEVC, new coding tools, including those in coding unit/prediction unit level, for both texture and depth views may be included and supported. A recent reference software test model for 3D-HEVC (3D-HTM) can be downloaded from the following link: https://hevc.h-hi.fraunhofer.de/svn/svn_3DVCSoftware/tags/HTM-7.0/.

A full citation for a recent reference software description as well as the working draft of 3D-HEVC is as follows: Tech et al., "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4th Meeting: Incheon, KR, 20-26 Apr. 2013. This reference software description and working draft of 3D-HEVC may be downloaded from the following link: http://phenix.it-sudparis.eu/jct2/doc_end_user/documents/4_Incheon/wg11/JCT3V-D1005-v1.zip.

The techniques described in this disclosure may be implemented by a video coder operating according to, for example, the SHVC, MV-HEVC or 3D-HEVC extensions of HEVC, or the MVC or SVC extensions of H.264. However, the techniques described in this disclosure are not limited to those standards, and may be extended to other video coding standards or extensions described herein, or other video coding standards or extensions not mentioned herein, including standards that provide for coding video data including multiple layers.

FIG. 1 is a block diagram illustrating an example video encoding and decoding system 10 that may utilize the techniques described in this disclosure. For example, system 10 includes source device 12 and destination device 14. Source device 12 and destination device 14 are configured to implement the techniques described in this disclosure. In some examples, system 10 may be configured to support encoding, transmission, storage, decoding, and/or presentation of encoded video data, such as video data encoded according to the HEVC standard, e.g., as described in WD10, and its extensions, such as for example, the extensions described in MV-HEVC WD3, SHVC WD1, "3D-HEVC Test Model 4," or the like. However, the techniques described in this disclosure may be applicable to other video coding standards or other extensions.

As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from source device 12 to a storage device 36. Similarly, encoded data may be accessed from storage device 36 by destination device 14. Storage device 36 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 36 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not limited, of course, to wireless applications or settings. The techniques may be applied to video coding in support of any of a variety of multimedia applications, such as over-the-air television broadcasts, cable television transmissions, satellite television transmissions, streaming video transmissions. e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 36 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16 and/or from storage device 36. The encoded video data communicated over link 16, or provided on storage device 36, may include a variety of syntax information, also referred to herein as syntax elements, generated by video encoder 20 for use by a video decoder, such as video decoder 30, in decoding the video data. Such syntax information may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the HEVC standard presently under development, as well as extensions of the HEVC standard, e.g., MV-HEVC, SHVC and 3D-HEVC. The techniques of this disclosure, however, are not limited to any particular coding standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Video encoder 20 and video decoder 30 each may operate, in general, in conformance with HEVC WD10, MV-HEVC WD3, SHVC WD1, and/or "3D-HEVC Test Model 4," as described above, or with other similar standards or extensions in which the techniques described in this disclosure may be useful.

In general, a video frame or picture may be divided into a sequence of treeblocks or LCUs, also referred to as CTBs, that include both luma and chroma samples. An LCU or CTB in the HEVC coding process has a similar purpose as a macroblock of the H.264 standard. A slice includes a number of consecutive treeblocks in coding order. A video frame or picture may be partitioned into one or more slices. Each LCU may be split into coding units (CUs) according to a quadtree. For example, an LCU, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU generally refers to an image region that serves as a basic unit to which various coding tools are applied for video compression. A CU typically has a square geometry, and may be considered to be similar to a so-called "macroblock" under other video coding standards, such as, for example, ITU-T H.264. A CU includes a coding node and prediction units (PUs) and transform units (TUs) associated with the coding node. A size of the CU corresponds to a size of the coding node and must be square in shape. The size of the CU may range from 8×8 pixels up to the size of the LCU, which has a maximum size of 64×64 pixels or greater.

Each CU may contain one or more PUs and one or more TUs. Syntax information associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax information associated with a CU may also describe, for example, partitioning of the CU into one or more TUs according to a quadtree. A TU can be square or non-square in shape.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 (L0) or RefPicList1 (L1)) for the motion vector.

In general, a TU is used for the transform and quantization processes. Following prediction, video encoder 20 may calculate residual values corresponding to the PU. The residual values comprise pixel difference values that may be transformed into transform coefficients according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided using a quadtree structure known as "residual quad tree" (RQT), with the leaf nodes being TUs.

This disclosure typically uses the term "video block" to refer to a coding node of a CU. In some specific cases, this disclosure may also use the term "video block" to refer to a treeblock, i.e., LCU, or a CU, which includes a coding node and PUs and TUs.

PUs may be considered to be similar to so-called partitions of a block under other video coding standards, such as H.264. PUs are the basis on which prediction for the block is performed to produce "residual" coefficients. Residual coefficients of a CU represent a difference between video data of the CU and predicted data for the CU determined using one or more PUs of the CU. Specifically, the one or more PUs specify how the CU is partitioned for the purpose of prediction, and which prediction mode is used to predict the video data contained within each partition of the CU.

One or more TUs of a CU specify partitions of a block of residual coefficients of the CU on the basis of which a transform is applied to the block to produce a block of residual transform coefficients for the CU. The one or more TUs may also be associated with the type of transform that is applied. The transform converts the residual coefficients from a pixel, or spatial domain to a transform domain, such as a frequency domain. In addition, the one or more TUs may specify parameters on the basis of which quantization is applied to the resulting block of residual transform coefficients to produce a block of quantized residual transform coefficients. The residual transform coefficients may be quantized to possibly reduce the amount of data used to represent the coefficients.

A CU generally includes one luminance component, denoted as Y, and two chrominance components, denoted as U and V. In other words, a given CU that is not further split into sub-CUs may include Y, U, and V components, each of which may be further partitioned into one or more PUs and TUs for purposes of prediction and transform of the CU, as previously described. For example, depending on the video sampling format, the size of the U and V components, in terms of a number of samples, may be the same as or different than the size of the Y component. As such, the techniques described above with reference to prediction, transform, and quantization may be performed for each of the Y, U, and V components of a given CU.

To encode a CU, one or more predictors for the CU are first derived based on one or more PUs of the CU. A predictor is a reference block that contains predicted data for the CU, and is derived on the basis of a corresponding PU for the CU, as previously described. For example, the PU indicates a partition of the CU for which predicted data is to be determined, and a prediction mode used to determine the predicted data. The predictor can be derived either through intra- (I) prediction (i.e., spatial prediction) or inter- (P or B) prediction (i.e., temporal prediction) modes. Hence, some CUs may be intra-coded (I) using spatial prediction with respect to neighboring reference blocks, or CUs, in the same frame, while other CUs may be inter-coded (P or B) with respect to reference blocks, or CUs, in other frames.

Upon identification of the one or more predictors based on the one or more PUs of the CU, a difference between the original video data of the CU corresponding to the one or more PUs and the predicted data for the CU contained in the one or more predictors is calculated. This difference, also referred to as a prediction residual, comprises residual coefficients, and refers to pixel differences between portions of the CU specified by the one or more PUs and the one or more predictors, as previously described. The residual coefficients are generally arranged in a two-dimensional (2-D) array that corresponds to the one or more PUs o the CU.

To achieve further compression, the prediction residual is generally transformed, e.g., using a discrete cosine transform (DCT), integer transform, Karhunen-Loeve (K-L) transform, or another transform. The transform converts the prediction residual, i.e., the residual coefficients, in the spatial domain to residual transform coefficients in the transform domain, e.g., a frequency domain, as also previously described. The transform coefficients are also generally arranged in a 2-D array that corresponds to the one or more TUs of the CU. For further compression, the residual transform coefficients may be quantized to possibly reduce the amount of data used to represent the coefficients, as also previously described.

To achieve still further compression, an entropy coder subsequently encodes the resulting residual transform coefficients, using Context Adaptive Binary Arithmetic Coding (CABAC), Context Adaptive Variable Length Coding (CAVLC), Probability Interval Partitioning Entropy Coding (PIPE), or another entropy coding methodology. Entropy coding may achieve this further compression by reducing or removing statistical redundancy inherent in the video data of the CU, represented by the coefficients, relative to other CUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example. "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector. e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In addition, video encoder 20 may decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded pictures for use in inter-picture prediction.

Video encoder 20 may output an encoded video bitstream that includes a sequence of bits that form a representation of the coded pictures and associated data, including syntax elements. The bitstream may comprise a sequence of network abstraction layer (NAL) units. Each of the NAL units may include a NAL unit header and may encapsulate a raw byte sequence payload (RBSP). The NAL unit header may include a syntax element that indicates a NAL unit type code. The NAL unit type code specified by the NAL unit header of a NAL unit indicates the type of the NAL unit. A RBSP may comprise a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a parameter set, a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

Video encoder 20 may include in the encoded video bitstream, in addition to the encoded video data, syntax information that informs video decoder 30 how to decode a particular block of video data, or grouping thereof. Video encoder 20 may include the syntax information in a variety of syntax structures, e.g., depending on the type of video structure (e.g., sequence, picture, slice, block) to which it refers, and how frequently its value may change. For example, video encoder 20 may include syntax elements in parameter sets, such as a Video Parameter Set (VPS), Sequence Parameter Set (SPS), or Picture Parameter Set (PPS). As other examples, video encoder 20 may include syntax elements in SEI messages and slice headers. When video encoder 20 include syntax information in parameter sets, video encoder 20 may include syntax information in the bitstream, e.g., in a slice header or SEI message, that activates a particular parameter set for a given sequence or picture. The activated parameter sets, e.g., active VPS, SPS, or PPS, may change based on such syntax information, e.g., on a sequence-to-sequence or picture-to-picture basis.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference blocks (intra-prediction) or reference blocks from another picture (inter-prediction) to produce the video block for eventual display. Video decoder 30 may be configured, instructed controlled or directed to perform the inverse of the various processes performed by video encoder 20 based on the syntax elements provided by video encoder 20 with the encoded video data in the bitstream received by video decoder 30.

Video encoder 20 and video decoder 30 may be individually or commonly referred to as a video coder. Additionally, the term "video coding" may refer to either or both of video encoding and video decoding.

Video encoder 20 and video decoder 30 may be configured to implement the techniques of this disclosure for coding video data comprising multiple layers, e.g., for scalable video coder or multiview video coding. In some examples, video decoder 30 may decode syntax information for a first layer of video data, the syntax information for the first layer defining a partitioning of pictures of the first layer of video data into tiles, and decode syntax information for a second layer of the video data, the syntax information for the second layer defining a partitioning of pictures of the second layer of video data into tiles. According to the techniques of this disclosure, the syntax information for the second layer defining the partitioning of pictures of the second layer is constrained based on the partitioning of the first layer of video data. Video decoder 30 may further partition pictures of the first and second layers of video data based on the syntax information for the first and second layers, and decode the first and second layers of video data based on the partitioning of the pictures of first and second layers of video data.

In some examples, video decoder 30 may partition pictures of each of first and second layers of video data into a plurality of tiles, wherein the partitioning of the pictures into tiles defines tile boundaries between the tiles, and decode respective syntax information for each of the first and second layers of video data, the syntax information for each of the layers indicating whether filtering of video data of one of the pictures of the layer based on other video data of the picture across at least one of the tile boundaries is allowed. According to the techniques of this disclosure, the syntax information for the first and second layers is constrained to, for both of the layers, either allow or disallow the filtering of video data of one of the pictures of the layer based on other video data of the picture of the layer across at least one of the tile boundaries. Video decoder 30 may further decode the plurality of layers of video data based on the partitioning and the syntax information.

In some examples, video decoder 30 may determine a first LCU size for a first layer of video data and a second LCU size for a second layer of the video data, wherein the second LCU size is constrained based on the first LCU size, and reconstruct the first and second layers of video data based on the LCU sizes for the first and second layers of video data.

In some examples, video decoder 30 may decode respective syntax information for each layer of the plurality of layers of the video data. The respective syntax information for each layer of the plurality of layers defines partitioning of a picture in the layer into a number of tiles. According to the techniques of this disclosure, the syntax information is constrained such that the number of tiles per picture for each layer of the plurality of layers is determined based on a maximum number of tiles per picture for the layer. The maximum number of tiles per picture for the layer may be determined based on a spatial resolution, or tier and level information, for the picture in the layer. Video decoder 30 may further reconstruct the picture in the at least one layer based on the partitioning of the picture into the number of tiles for the layer.

Video encoder 20 also may be configured to perform methods in accordance with the examples of this disclosure. In some examples, video encoder 20 may encode syntax information for a first layer of video data, the syntax information for the first layer defining a partitioning of pictures of the first layer of video data into tiles, and encode syntax information for a second layer of the video data, the syntax information for the second layer defining a partitioning of pictures of the second layer of video data into tiles. According to the example techniques of this disclosure, the syntax information for the second layer defining the partitioning of pictures of the second layer is constrained based on the partitioning of the first layer of video data. Video encoder 20 may also partition pictures of the first and second layers of video data based on the syntax information for the first and second layers, and encode the first and second layers of video data based on the partitioning of the pictures of first and second layers of video data.

In some examples, video encoder 20 may encode syntax information for a first layer of video data, the syntax information for the first layer defining whether partitioning pictures of the first layer of video data into tiles is enabled and whether decoding the first layer of video data using wavefront parallel processing (WPP) is enabled, and encode syntax information for a second layer of the video data, the syntax information for the second layer defining whether partitioning pictures of the second layer of video data into tiles is enabled and whether decoding the second layer of video data using WPP is enabled. According to the techniques of this disclosure, the syntax information for the second layer is constrained based on whether partitioning pictures of the first layer of video data into tiles is enabled or decoding the first layer of video data using WPP is enabled. Video encoder 20 may further encode the first and second layers of video data based on the respective syntax information for the first and second layers of video data.

In some examples, video encoder 20 partitions pictures of each of first and second layers of video data into a plurality of tiles, wherein the partitioning of the pictures into tiles defines tile boundaries between the tiles, and encode respective syntax information for each of the first and second layers of video data, the syntax information for each of the layers indicating whether filtering of video data of one of the pictures of the layer based on other video data of the picture across at least one of the tile boundaries is allowed. According to the techniques of this disclosure, the syntax information for the first and second layers is constrained to, for both of the layers, either allow or disallow the filtering of video data of one of the pictures of the layer based on other video data of the picture of the layer across at least one of the tile boundaries. Video encoder 20 may further encode the plurality of layers of video data based on the partitioning and the syntax information.

In some examples, video encoder 20 determines a first LCU size for a first layer of video data and a second LCU size for a second layer of the video data, and constrains the second LCU size based on the first LCU size, and encode the first and second layers of video data based on the LCU sizes for the first and second layers of video data.

In some examples, video encoder 20 may partition a picture in each layer of the plurality of layers of the video data into a number of tiles for the layer. To partition the picture into the number of tiles, video encoder 20 determines a maximum number of tiles per picture for the layer based on a spatial resolution, or tier and level information, for the picture in the layer, and constrains the number of tiles per picture for the layer based on the maximum number of tiles per picture for the layer. Video encoder 20 may further encode the picture in each layer of the plurality of layers based on the partitioning of the picture into the number of tiles per picture for the layer, and encode respective syntax information for each layer of the plurality of layers of the video data. The respective syntax information for each layer of the plurality of layers defines the partitioning of the picture in the layer into the number of tiles per picture for the layer.

In some examples, video encoder 20 and video decoder 30 may employ techniques for scalable video coding, e.g., coding of video data including two or more layers. In some examples, video encoder 20 and video decoder 30 may employ techniques for multiview video coding, e.g., coding of video data including two or more views. The views in multiview video coding may be considered special cases of layers. As used herein, the term layer may refer to a layer for scalable video coding, or a layer that is a view for multiview video coding.

Figure 2:
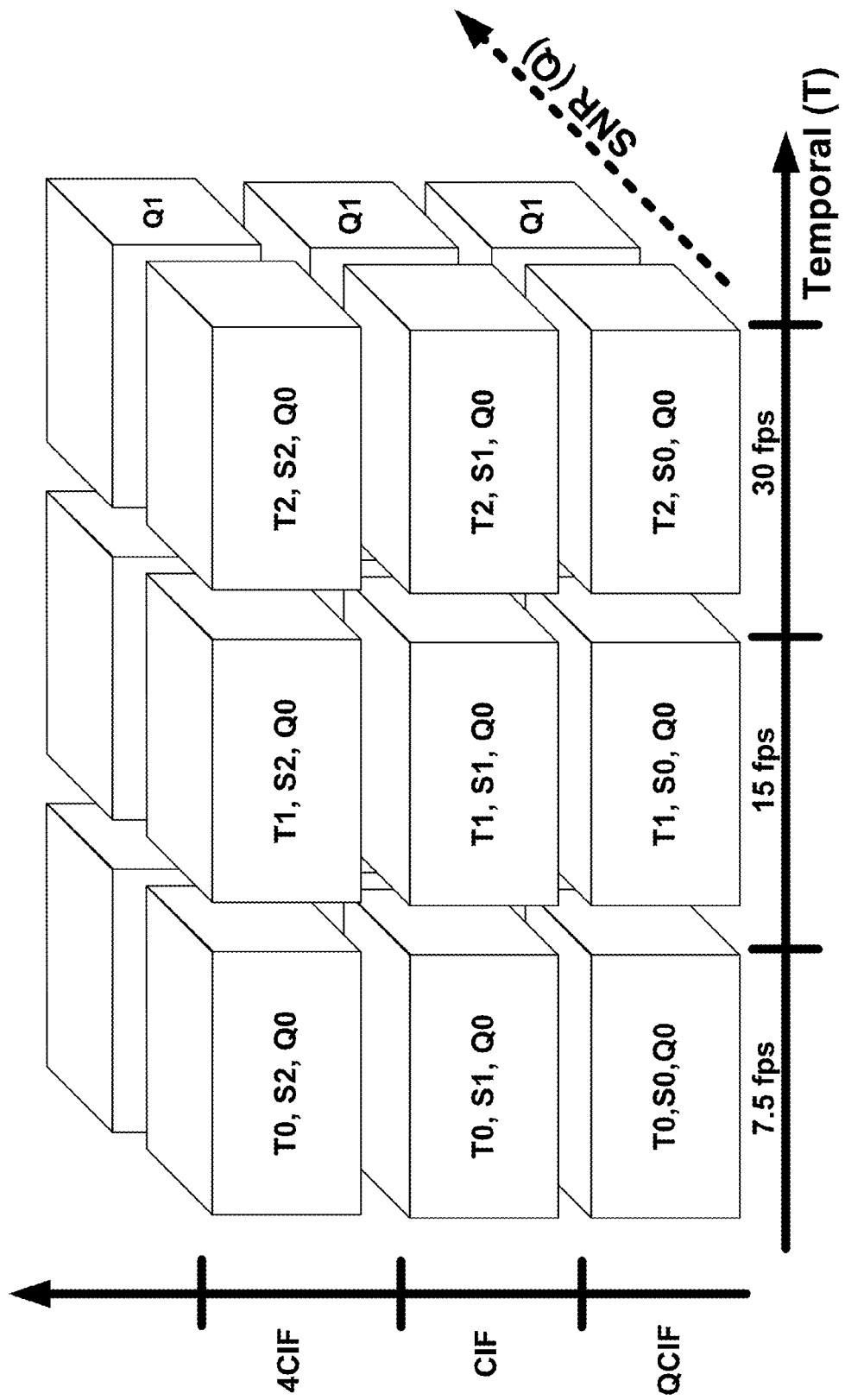
FIG. 2 is a conceptual diagram illustrating various scalable dimensions for scalable video coding (SVC).

FIG. 2 is a conceptual diagram illustrating various scalable dimensions for scalable video coding (SVC). FIG. 2 illustrates an example of the scalability structure of SVC. In particular, an example of scalabilities in different dimensions is shown in FIG. 2. In the example of FIG. 2, scalabilities are enabled in three dimensions. In the time dimension, frame rates with 7.5 Hz, 15 Hz or 30 Hz can be supported by temporal scalability (T). When spatial scalability (S) is supported, different resolutions, such as QCIF, CIF, and 4CIF, may be enabled. For each specific spatial resolution and frame rate, signal-to-noise (SNR) (Q) layers can be added to improve the picture quality.

Once video content has been encoded in such a scalable way, an extractor tool may be used to adapt the actual delivered content according to application requirements, which may be dependent, e.g., on the clients or the transmission channel. In the example shown in FIG. 2, each cubic volume, i.e., cube, contains the pictures with the same frame rate (temporal level), spatial resolution and SNR layers. Better representation can be achieved by adding those cubes (pictures) in any dimension. Combined scalability may be supported when there are two, three or even more scalabilities enabled.

In some examples of SVC, the pictures with the lowest spatial and quality layer may be compatible with a base specification. In some examples, the pictures at the lowest temporal level form the temporal base layer, which can be enhanced with pictures at higher temporal levels. In addition to the base layer, several spatial and/or SNR enhancement layers can be added to provide spatial and/or quality scalabilities. SNR scalability is also referred to as quality (Q) scalability. Each spatial or SNR enhancement layer itself may be temporally scalable, with the same temporal scalability structure as the base layer. For one spatial or SNR enhancement layer, the lower layer it depends on is also referred to as the base layer of that specific spatial or SNR enhancement layer.

FIG. 3 is a conceptual diagram illustrating an example of the SVC coding structure. In, this example, the pictures with the lowest spatial and quality layer (pictures in layer 0 and layer 1, with QCIF resolution) may be compatible with a base specification. Among them, those pictures of the lowest temporal level form the temporal base layer, as shown in layer 0 of FIG. 3. This temporal base layer (layer 0) can be enhanced with pictures of higher temporal levels (layer 1). In addition to the base layer, several spatial and/or SNR enhancement layers can be added to provide spatial and/or quality scalabilities. For instance, the enhancement layer can be a CIF representation with the same resolution as layer 2. In this example, layer 3 is a SNR enhancement layer. As shown in this example, each spatial or SNR enhancement layer itself may be temporally scalable, with the same temporal scalability structure as the base layer. Also, an enhancement layer can enhance both spatial resolution and frame rate. For example, layer 4 provides a 4CIF enhancement layer, which further increases the frame rate from 15 Hz to 30 Hz.

Figure 4:
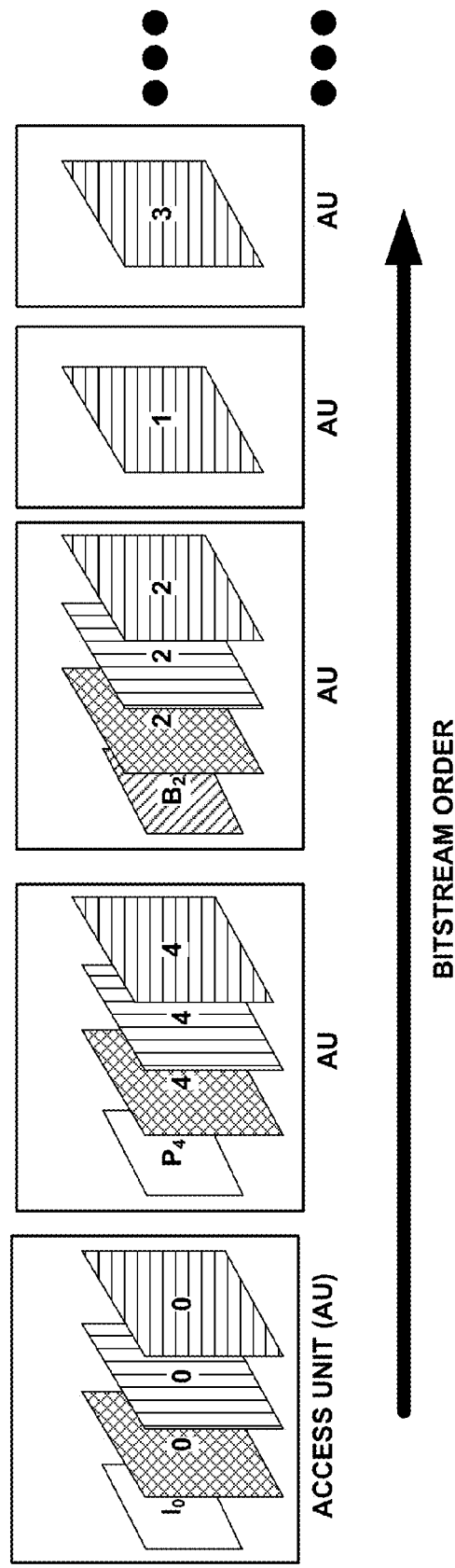
FIG. 4 is a conceptual diagram illustrating example access units (AUs).

FIG. 4 is a conceptual diagram illustrating example access units (AUs). Each access unit represents a time instance and, as illustrated in FIG. 4, includes the video data, e.g. a picture or one or more slices, in each of one or more layers at the time instance. The video data of an AU may be encapsulated within network abstraction layer (NAL) units. There may be zero or more NAL units per access unit per layer. A set of NAL units corresponding to one layer within one access unit may be referred to as a "layer component."

The example of FIG. 4 portrays layer components corresponding to the layer components of FIG. 3. As shown in the example of FIG. 4, the pictures or slices in the same time instance (i.e., within a common AU) are successive in the bitstream order and form one AU in the context of SVC. Those SVC access units then follow the decoding order, which could be different from the display order and decided, e.g., by the temporal prediction relationship.

As discussed above, in some examples, video encoder 20 and video decoder 30 may employ techniques for multiview video coding, e.g., coding of video data including two or more views. In some examples, a device, e.g., video source 18, may generate the two or more pictures by, for example, using two or more spatially offset cameras, or other video capture devices, to capture a common scene. Two pictures of the same scene captured simultaneously, or nearly simultaneously, from slightly different horizontal positions can be used to produce a three-dimensional effect. In some examples, video source 18 (or another component of source device 12) may use depth information or disparity information to generate a second (or other additional) picture of a second (or other additional) view at a given time instance from a first picture of a first view at the given time instance. In this case, a view within an access unit may include a texture component corresponding to a first view and a depth component that can be used, with the texture component, to generate a second view. The depth or disparity information may be determined by a video capture device capturing the first view, e.g., based camera parameters or other information known regarding the configuration of the video capture device and the capturing of the video data for the first view. The depth or disparity information may additionally or alternatively be calculated, e.g., by video source 18 or another component of source device 12, from camera parameters and/or video data in the first view.

To present 3D video, display device 32 of destination device 14 may simultaneously, or nearly simultaneously, display two pictures associated with different views of a common scene, which were captured simultaneously or nearly simultaneously. In some examples, a user of destination device 14 may wear active glasses to rapidly and alternatively shutter left and right lenses, and display device 32 may rapidly switch between a left view and a right view in synchronization with the active glasses. In other examples, display device 32 may display the two views simultaneously, and the user may wear passive glasses, e.g., with polarized lenses, which filter the views to cause the proper views to pass through to the user's eyes. In other examples, display device 32 may comprise an autostereoscopic display, which does not require glasses for the user to perceive the 3D effect.

Multiview video coding refers to the manner in which a plurality of views are coded. In the case of 3D video coding, the plurality of views may, for example, correspond to a left-eye view and a right-eye view. Each view of the plurality of views includes a plurality of pictures. The viewer's perception of a 3D scene is due to the horizontal disparity between objects in the pictures of the different views.

Figure 5:
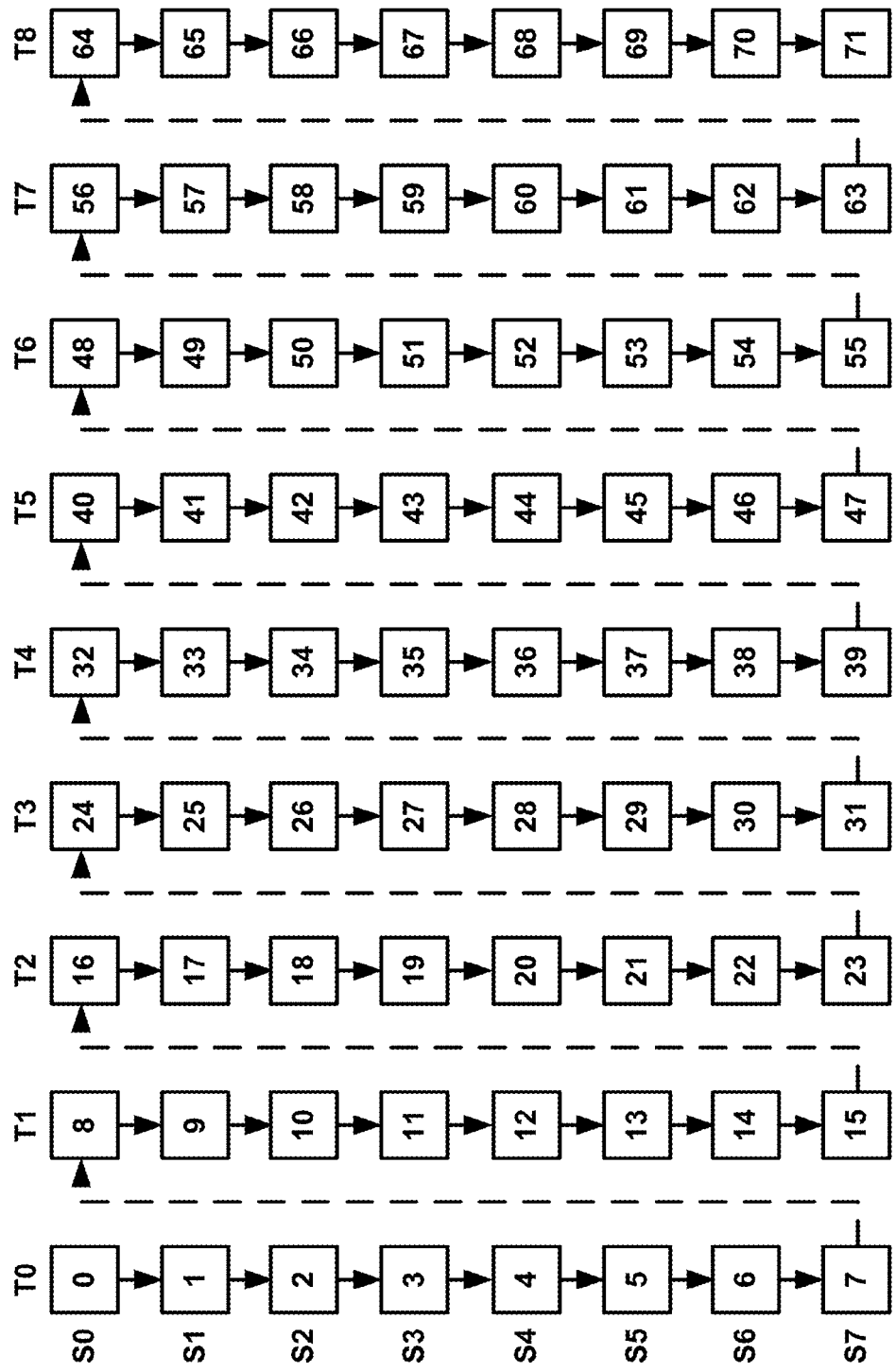
FIG. 5 is a conceptual diagram illustrating an example multiview encoding or decoding order.

FIG. 5 is a conceptual diagram illustrating an example multiview encoding or decoding order. The decoding order arrangement illustrated in FIG. 5 may be referred to as time-first coding. In general, a multiview or 3D video sequence may include, for each access unit (i.e., with the same time instance), two or more pictures for each of two or more views, respectively.

In FIG. 5, S0-S7 each refer to different views of the multiview video. T0-T8 each represent one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth. In this examples, pictures 0-7 are at a same time instance (i.e., time instance T0), pictures 8-15 at a same time instance (i.e., time instance T1). Pictures with the same time instance are generally displayed at the same time, and it is the horizontal disparity, and possibly some vertical disparity, between the objects within the pictures of the same time instance that cause the viewer to perceive an image that encompasses a 3D volume.

In FIG. 5, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. In some examples, each set may include two pictures: one picture is referred to as a texture view component, and the other picture is referred to as a depth view component. The texture view component and the depth view component within a set of pictures of a view may be considered as corresponding to one another. For example, the texture view component within a set of pictures of a view can be considered as corresponding to the depth view component within the set of the pictures of the view, and vice-versa (i.e., the depth view component corresponds to its texture view component in the set, and vice-versa). As used in this disclosure, a texture view component and a depth view component that correspond may be considered to be part of a same view of a single access unit.

In accordance with multiview coding, a video block in one view may be inter-predicted from a video block in the same view or from a video block in a different, reference view. Prediction of video data in one view based on video data in another view may be referred to as inter-view prediction. Video encoder 20 and video decoder 30 may, for example, perform inter-view prediction of a current video block in a current picture in a current view by using information of a reference block of a reference picture in a reference view.

Figure 6:
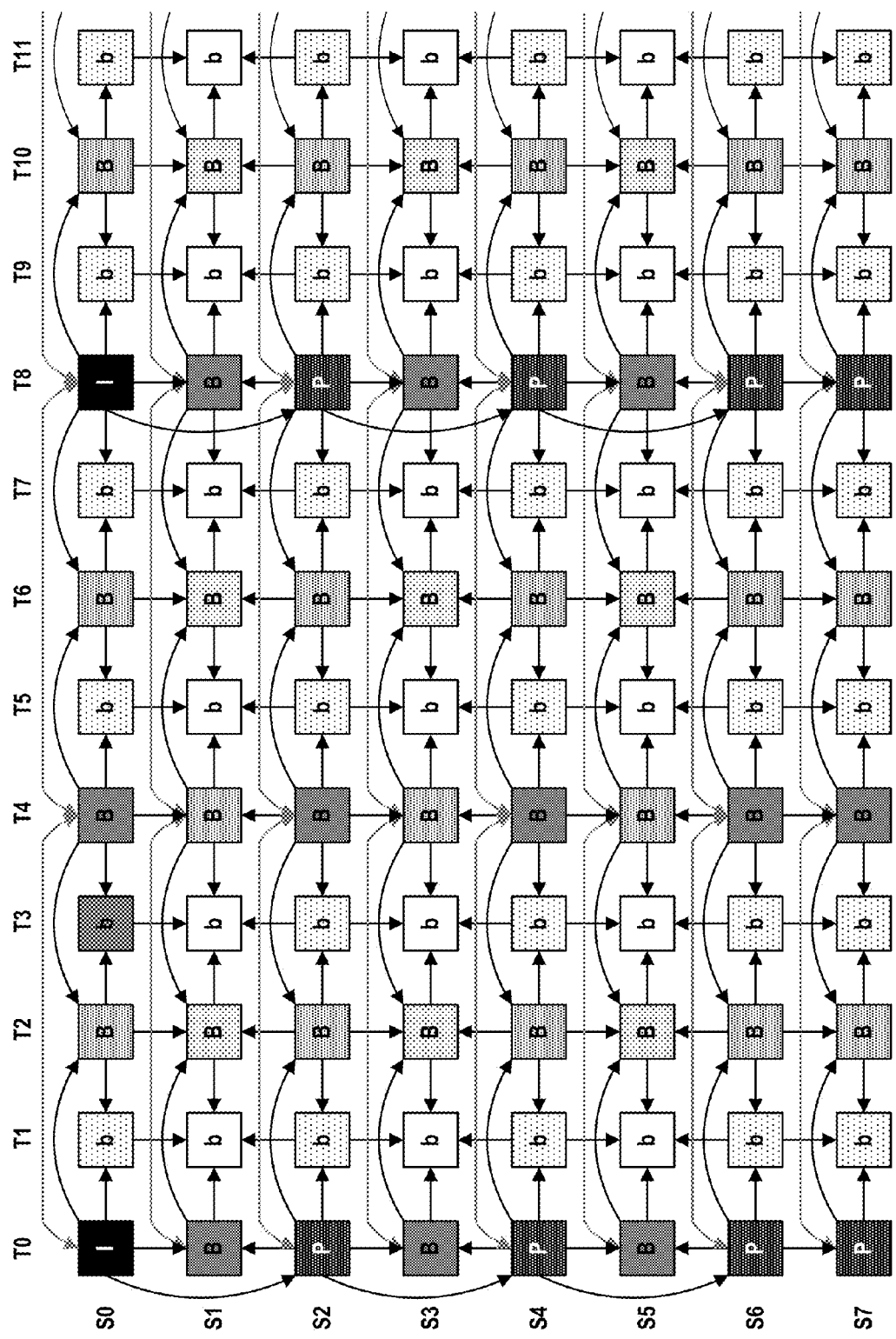
FIG. 6 is a conceptual diagram illustrating an example temporal and inter-view prediction pattern for multiview video coding.

FIG. 6 is a conceptual diagram illustrating an example temporal and inter-view prediction pattern for multiview video coding. Similar to the example of FIG. 5, in the example of FIG. 6, eight views (having view IDs "S0" through "S1") are illustrated, and twelve temporal locations or access units ("T0" through "T11") are illustrated for each view. That is, each row in FIG. 6 corresponds to a view, while each column indicates a temporal location or access unit. Objects (which may be pictures, or example video blocks in different pictures) are indicated at the intersection of each row and each column in FIG. 6. The H.264/AVC standard with MVC extensions may use the term frame to represent a portion of the video, while HEVC standard may use the term picture to represent a portion of the video. This disclosure uses the term picture and frame interchangeably.

In FIG. 6, view S0 may be considered as a base view, and views S1-S7 may be considered as dependent views. A base view includes pictures that are not inter-view predicted. Pictures in a base view can be inter-predicted with respect to other pictures in the same view. For instance, none of the pictures in view S0 can be inter-predicted with respect to a picture in any of views S1-S7, but some of the pictures in view S0 can be inter-predicted with respect to other pictures in view S0.

Additionally, access units T0 and T8 are random access units or random access points for the video sequence of the example prediction structure of FIG. 6. As illustrated by the blocks labeled "I" in the example prediction structure of FIG. 6, at each random access point (T0 and T8), the video blocks of the base view picture (S0) are intra-picture predicted. The video blocks of other non-base view pictures in the random access points, or of base and non-base view pictures in non-random access points, may be inter-picture predicted, either via temporal inter prediction or inter-view prediction, as illustrated by the various blocks labeled "I," "B," "P," or "b" in the example prediction structure of FIG. 6. The predictions in the example prediction structure of FIG. 6 are indicated by arrows, with the pointed-to object using the pointed-from object for prediction reference.

A dependent view includes pictures that are inter-view predicted. For example, each one of views S1-S7 includes at least one picture that is inter-predicted with respect to a picture in another view. Pictures in a dependent view may be inter-predicted with respect to pictures in the base view, or may be inter-predicted with respect to pictures in other dependent views. In the example of FIG. 6, capital "B" and lowercase "b" are used to indicate different hierarchical relationships between pictures, rather than different coding methodologies. In general, capital "B" pictures are relatively higher in the prediction hierarchy than lowercase "b" frames.

A video stream that includes both a base view and one or more dependent views may be decodable by different types of video decoders. For example, one basic type of video decoder may be configured to decode only the base view. In addition, another type of video decoder may be configured to decode each of views S0-S7. A decoder that is configured to decode both the base view and the dependent views may be referred to as a decoder that supports multiview coding.

The pictures (or other objects) in FIG. 6 are illustrated using a shaded block including a letter, designating whether the corresponding picture is intra-coded (that is, an I-picture), inter-coded in one direction (that is, as a P-picture), or inter-coded in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multiview video coding video sequence may be predictively encoded with respect to pictures at different temporal locations. For example, the B-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component (e.g., a texture view component) can use the view components in other views for reference. In multiview coding, for example, inter-view prediction is realized as if the view component in another view is an inter-prediction reference. The potential inter-view references may be signaled, and can be modified by the reference picture list construction process, which enables flexible ordering of the inter-prediction or inter-view prediction references.

FIG. 6 provides various examples of inter-view prediction. Pictures of view S1, in the example of FIG. 6, are illustrated as being predicted from pictures at different temporal locations of view S1, as well as inter-view predicted from pictures of views S0 and S2 at the same temporal locations. For example, the B-picture of view S1 at temporal location T1 is predicted from each of the B-pictures of view S1 at temporal locations T0 and T2, as well as the B-pictures of views S0 and S2 at temporal location T1.

FIG. 6 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 6 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy may be related to view order indexes, in that pictures relatively higher in the prediction hierarchy should be decoded before decoding pictures that are relatively lower in the hierarchy. Those pictures relatively higher in the hierarchy can be used as reference pictures during decoding of the pictures relatively lower in the hierarchy. A view order index is an index that indicates the decoding order of view components in an access unit. The decoding of the view components may follow the ascending order of the view order index. If all the views are presented, then the set of view order indexes may comprise a consecutively ordered set from zero to one less than the full number of views.

For certain pictures at equal levels of the hierarchy, the decoding order may not matter relative to each other. For example, the I-picture of view S0 at temporal location T0 may be used as a reference picture for the P-picture of view S2 at temporal location T0, which, in turn, may be used as a reference picture for the P-picture of view S4 at temporal location T0. Accordingly, the I-picture of view S0 at temporal location T0 should be decoded before the P-picture of view S2 at temporal location T0, which in turn, should be decoded before the P-picture of view S4 at temporal location T0. However, between views S1 and S3, a decoding order does not matter, because views S1 and S3 do not rely on each other for prediction. Instead views S1 and S are predicted only from other views that are higher in the prediction hierarchy. Moreover, view S1 may be decoded before view S4, so long as view S1 is decoded after views S0 and S2.

As described above, video encoder 20 and video decoder 30 may inter-predict a current block within a current picture of a first view with reference to a reference block within a reference picture of a second view. Such inter-prediction is referred to as inter-view prediction. The time instance of the current picture and the reference picture may be the same in respective views. In such examples, video encoder 20 or video decoder 30 perform inter-view prediction across pictures in a same access unit, where pictures in the same access unit are at the same time instance.

To perform inter-view prediction on the current block, video encoder 20 or video decoder 30 construct reference picture lists that identify reference pictures that can be used for inter-prediction, including pictures that can be used for inter-view prediction. Inter-prediction refers to predicting a current block in a current picture with respect to a reference block in a reference picture. Inter-view prediction is a subset of inter prediction in that in inter-view prediction, the reference picture is in a view different than the view of the current picture. Accordingly, for inter-view prediction, video encoder 20 and video decoder 30 add the reference picture in the other view in one or both of the constructed reference picture lists. The reference picture in the other view can be identified at any location within the constructed reference picture lists.

Figure 7:
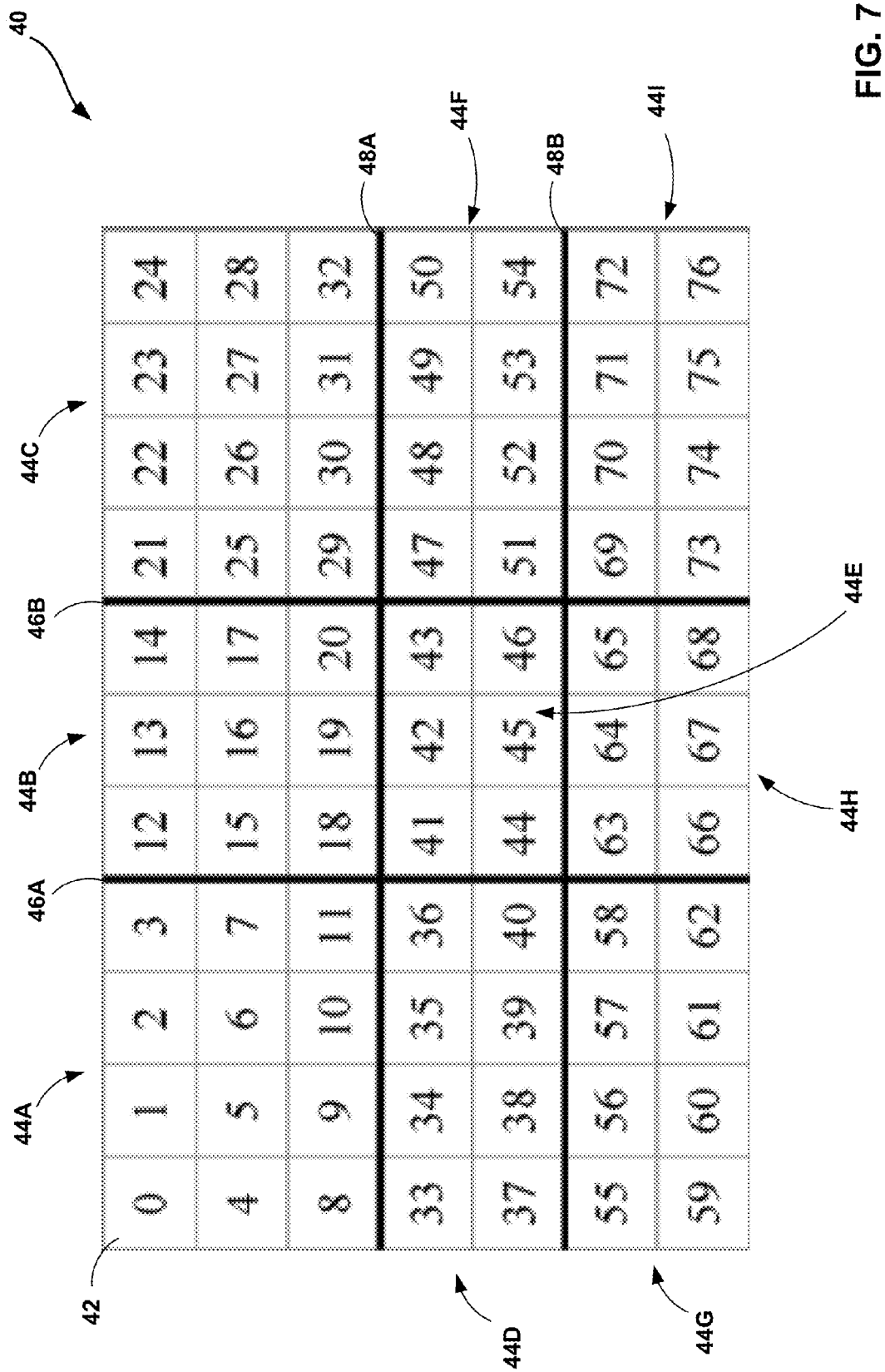
FIG. 7 is a conceptual diagram illustrating an example picture partitioned into tiles.

FIG. 7 is a conceptual diagram illustrating an example picture 40 partitioned into tiles. In the example of FIG. 7, picture 40 is partitioned, e.g., by a video coder, into a plurality of LCUs 42. In FIG. 7, only one of LCUs is labeled, for ease of illustration.

Example picture 40 of FIG. 7 is also partitioned, e.g., by a video coder, into a plurality of tiles 44A-44I (collectively, "tiles 44"). The video coder may partition picture 40 into tiles 44 based on vertical tile boundaries 46A and 46B (collectively, "vertical tile boundaries 46"), and horizontal tile boundaries 48A and 48B (collectively, "horizontal tile boundaries 48"). Intersecting column and row boundaries delineate the rectangular tiles.

The number and size of tiles 44 of picture 40 illustrated in FIG. 7 is merely one example. A video coder may use any number, e.g., 0, 1, 2, 3, etc., vertical tile boundaries 46, and any number, e.g., 0, 1, 2, 3, etc., horizontal tile boundaries 48 to partition picture into any number of tiles 44. A picture with no boundaries 46 and 48 may be considered to not have any tiles, or to have a single tile. Additionally, the locations of boundaries 46 and 48 are merely an example, and a video coder may locate boundaries 46 and 48 differently to change the sizes (vertical and/or horizontal dimensions) of any of tiles 44.

The two vertical picture boundaries (edges or ends of the picture or frame) can be considered as two vertical tile boundaries and the two horizontal picture boundaries (edges or ends of the picture or frame) can be considered as two horizontal tile boundaries. In the example of FIG. 7, if there are 4 vertical tile boundaries (including the vertical picture boundaries) and 4 horizontal tile boundaries (including the horizontal picture boundaries), then the picture is partitioned into (4−1)×(4−1)=9 tiles. The spacing between vertical and horizontal tile boundaries may, but need not be, uniform.

HEVC contains several proposals to make the codec more parallel-friendly, including enabling a video coder, e.g., video encoder 20, to partition a picture, such as picture 40, into tiles 44. Tiles 44 are rectangular. Tiles 44 include an integer number of LCUs 42, which may also be referred to as CTBs or treeblocks, co-occurring in one column and one row, ordered consecutively in an LCU raster scan of the tile. Tiles 44 in picture 40 are ordered consecutively in tile raster scan of the picture, as shown in FIG. 7. A video coder, e.g., video encoder 20 and/or video decoder 30, may process, e.g., predict and code, tiles 44 in parallel, or in raster scan order, i.e., tiles 44A-44I in order. For each tile 44, the video coder processes the LCUs 42 within the tile 44 in an LCU raster scan order of the tile, as illustrated by the numbers within tiles 44. For example, a video coder may process LCUs 42 within tile 44A in the numeric order 0, 1, 2, etc., which is the raster scan order within tile 44A.

A video coder, e.g., video encoder 20, may define the number of tiles 44 and the location of their boundaries 46, 48 for the entire sequence, or may change the number of tiles 44 and the location of their boundaries 46, 48 from picture to picture. Video encoder 20 may include syntax information, e.g., in parameter sets, such as a PPSs, that defines the partitioning of a picture into tiles, e.g., the number of tiles 44 and the location of their boundaries 46, 48. Video encoder 20 may also include syntax information in the bitstream, e.g., in slice headers, identifying an active parameter set, e.g., active PPS, that defines the partitioning of a particular picture 40 into tiles 44.

Tile boundaries 46, 48 may break parse and prediction dependences, similarly to slice boundaries, so that a tile 44 can be processed independently by parallel processing units, cores or threads in a video coder, e.g., video encoder 20 and/or video decoder 30. This may facilitate parallel processing of tiles by video coders. In such examples, communication between the processing units or threads may not be required for entropy coding and prediction, e.g., motion compensation, of the tiles. In other examples, however, loop filters, such as deblocking and sample adaptive offset (SAO) filters, may still cross tile boundaries. In such examples, a video coder may require video data from another, neighboring tile when loop filtering video data within a current tile. In some examples, the value of a syntax element, e.g., loop_filter_across_tiles_enabled_flag, may indicate whether loop filtering is allowed across tile boundaries 46, 48, e.g., loop_filter_across_tiles_enabled_flag set to 0 may indicate that loop filtering is allowed across tile boundaries 46, 48, except for the tile boundaries that are also picture boundaries or slice boundaries.

A video coder may also partition pictures, such as picture 40, into slices. A slice consists of an integer number of LCUs in raster scan order. Unlike tiles, the boundaries between slices are not necessarily vertical and/or horizontal lines across a picture, and slices are accordingly not necessarily rectangular. A slice corresponds to a single network abstraction layer (NAL) unit, and in-picture prediction is not permitted across slice boundaries. A slice (or NAL) may include more than one tile, or a tile may include more than once slice. When a slice contains LCUs in more than one tile, the tiles containing the LCUs shall be contiguous. Tiles T and T+1 are said to be contiguous if the first LCU in T+1 immediately follows, in transmission order, the last LCU in T. Compared to slices, tiles may have a better coding efficiency, because tiles allow picture partition shapes, e.g., rectangular, that may contain samples with a potential higher correlation than slices. Partitioning pictures into tiles may also reduce the number of slices and/or the syntax information included in slice headers, and thereby reduce slice header overhead.

Partitioning picture 40 into tiles 44 may enable parallel processing of the video data in the different tiles by different processing units, cores, or threads. Partitioning picture 40 into tiles 44 may also improve coding efficiency, e.g., by allowing a changed decoding order of LCUs compared to the use of slices.

When a tile is used in single-layer coding, the syntax element min_spatial_segmentation_idc may be used by video decoder 30 to calculate the maximum number of luma samples to be processed by one processing thread, making the assumption that the decoder maximally utilizes the parallel decoding information. However, there may be some picture inter-dependencies between the different threads, e.g., due to entropy coding synchronization or de-blocking filtering across tile or slice boundaries. HEVC includes a note which encourages video encoders 20 to set the value of min_spatial_segmentation_idc to be the highest possible value.

Figure 8:
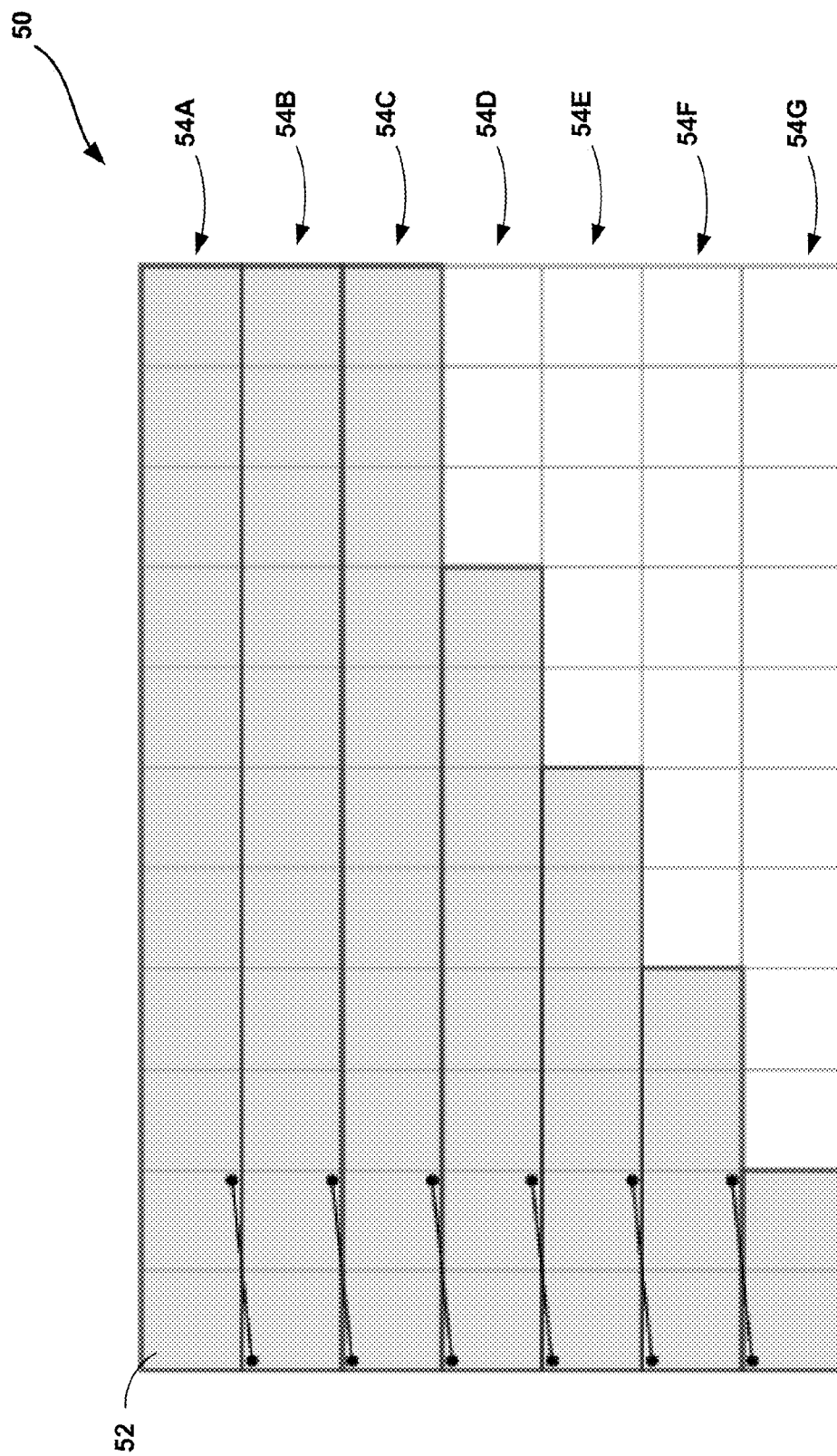
FIG. 8 is a conceptual diagram illustrating an example of wavefront parallel processing (WPP) of a picture.

FIG. 8 is a conceptual diagram illustrating an example of wavefront parallel processing (WPP) of a picture 50. HEVC contains several proposals to make the codec more parallel-processing friendly, including WPP. As illustrated in FIG. 8, picture 50 is partitioned into LCUs 52. Only one LCU 52 is labeled in FIG. 8, for ease of illustration.

When WPP is enabled, each LCU row of a picture is a separated partition. In the example of FIG. 8, picture 50 includes LCU rows 54A-54G (collectively, "LCU rows 54"), which may be separated partitions for WPP. When WPP is enabled, a number of processing units, cores, or threads, up to the number of LCU rows 54, can work in parallel to process the LCU row (or lines). Compared to slices and tiles, however, no coding dependences are broken at boundaries of LCU rows 54, e.g., prediction and/or filtering of video data in one LCU row 54 based on video data in another LCU row is allowed. Also, WPP does not change the regular raster scan order. Additionally, to further reduce coding loss, video coders may propagate entropy coding information, e.g., CABAC probabilities, between LCU rows 54, e.g., from the second LCU 52 of the previous row 54 to the first LCU 52 of the current LCU row 54, as illustrated by the lines in the first two columns of LCUs 52 of picture 50 in FIG. 8.

Because dependences are not broken, the rate-distortion loss of a WPP bitstream is small, compared to a nonparallel bitstream. The dependence on video data from other LCU rows 54 for coding video data in a current LCU row 54, however, does not allow all LCU rows 54 to start decoding at the beginning of the picture. Consequently, LCU rows 54 also cannot finish decoding at the same time at the end of the picture. This introduces parallelization inefficiencies that become more evident when a high number of processors are used to process a higher number of LCU rows 54 in parallel.

Existing techniques for coding video data that includes a plurality of layers, e.g., including use of tiles and WPP for parallelization, may be associated with problems, as described herein. Some of the problems are described below with respect to FIGS. 9A-12. The techniques described herein, including with respect to FIGS. 9A-12, may address those problems.

As described in greater detail below, the techniques may include various bitstream restrictions or constraints on the partitioning of pictures, such as into largest coding units (LCUs) or tiles, and/or picture processing techniques, such as WPP, across layers of video data. The bitstream restrictions described herein may, in some examples, facilitate more efficient, evenly distributed, and synchronized, parallel processing of video data including a plurality of layers. The bitstream restrictions described herein may also, in some examples, facilitate simplified pipelining design and implementation of parallel processing in a video codec. The bitstream restrictions described herein may also, in some examples, facilitate easier mapping of co-located coding units across different layers, e.g., for inter-layer prediction or filtering. The bitstream restrictions described herein may also, in some examples, facilitate more flexible use of tiles across different layers. The restrictions or constraints may be imposed on bitstreams conforming to HEVC extensions, such as the SHVC, MV-HEVC, or 3D-HEVC extensions of the HEVC standard, or any other video coding standard or extension, e.g., that includes coding video data with multiple layers.

Each possible configuration of tiles and WPP across a plurality of layers may increase the complexity of the design and implementation of a video coder and codec for pipelining and parallel processing. In a video coder, the pipeline design and allocation of resources across layers needs to change for different configurations of tiles and WPP. In particular, the memory, cycles and the delay requirements are different for different configurations of tiles and WPP across layers.

Some possible configurations of tiles and WPP across a plurality of layers may provide little or no noticeable benefit with respect to coding fidelity or efficiency. Supporting such configurations of tiles and WPP across layers may unnecessarily burden the pipelining design and implementation of the codec relative to the coding benefit achieved. Consequently, it may be advantageous to normatively restrict non-typical configurations of tiles and WPP across layers, and thereby reduce design and implementation complexity. A few example configurations of tiles and WPP across layers are shown in FIGS. 9A-10B.

FIGS. 9A and 9B are conceptual diagrams illustrating different layers of video data having different numbers of tiles per picture. For example, FIG. 9A illustrates an example picture 60 in the base layer (BL) partitioned into four tiles 62A-62D (collectively, "tiles 62"). FIG. 9A also illustrates an example picture 64 in an enhancement layer (EL) partitioned into two tiles 66A and 66B (collectively "tiles 66"). In the configuration of tiles across layers illustrated in FIG. 9A, picture 60 in the base layer (BL) has more tiles 62 than the number of tiles 66 in the enhancement layer (EL).

FIG. 9B illustrates an example picture 70 in the base layer (BL) partitioned into two tiles 72A and 72B (collectively, "tiles 72"). FIG. 9B also illustrates an example picture 74 in an enhancement layer (EL) partitioned into four tiles 76A-76D (collectively "tiles 76"). In the configuration of tiles across layers illustrated by FIG. 9B, picture 70 in the base layer (BL) has more tiles 72 than the number of tiles 76 in picture 74 in the enhancement layer (EL). In both of the examples of FIGS. 9A and 9B, the spatial resolution of the EL may be higher than that of the BL.

For a multi-core system design, such as the design of a video coder that includes a plurality of parallel processing units, cores or threads, the tile configuration illustrated by FIG. 9A, i.e., with more tiles 62 per picture in the BL than tiles 64 per picture in the EL, may not provide any benefit over the tile configuration illustrated by FIG. 9B, i.e., with more tiles 74 per picture in the EL than tiles 72 per picture in the BL. Additionally, having more tiles 62 in the BL than tiles 64 in the EL may lead to unevenly distributed processing load across layers, and may be unfriendly for synchronized inter-layer parallelism. Accordingly, techniques are described herein to constrain the bitstream, e.g., syntax information within the bitstream, to disallow tile configurations across layers in which a reference layer, e.g., the base layer, has more tiles per picture than a layer dependent on the reference layer, e.g., an enhancement layer. The techniques described herein may reduce design and implementation complexity of a video coder that partitions pictures into tiles across multiple layers.

In some examples, a conforming bitstream shall obey the following constraints:

a) The value of num_tile_columns_minus1 of a layer with a particular value of nuh_layer_id greater than 0 shall be greater than or equal to the value of num_tile_columns_minus1 of any of the layer's direct reference layers.

b) The value of num_tile_rows_minus1 of a layer with a particular value of nuh_layer_id greater than 0 shall be greater than or equal to the value of num_tile_rows_minus1 of any of the layer's direct reference layers.

Accordingly, in some examples, when video encoder 20 encodes syntax information regarding the number of tiles in a particular layer, video encoder 20 constrains the syntax information to disallow tile configurations across layers in which a reference layer, e.g., the base layer, has more tiles per picture than a layer dependent on the reference layer, e.g., an enhancement layer. In some examples, video encoder 20, constrains a value of num_tile_columns_minus1 of a layer with a particular value of nuh_layer_id greater than 0 to be greater than or equal to the value of num_tile_columns_minus1 of any direct reference layers of that layer, and constrains the value of num_tile_rows_minus1 of that layer with the particular value of nuh_layer_id greater than 0 to be greater than or equal to the value of num_tile_rows_minus1 of any direct reference layers of that layer. In some examples, when video decoder 30 decodes an encoded video bitstream, the syntax information is constrained to disallow tile configurations across layers such that a reference layer, e.g., the base layer, has more tiles per picture than a layer dependent on the reference layer, e.g., an enhancement layer. In some examples, when video decoder 30 decodes an encoded video bitstream, a value of num_tile_columns_minus1 of a layer with a particular value of nuh_layer_id greater than 0 is constrained to be greater than or equal to the value of num_tile_columns_minus1 of any direct reference layers of that layer, and the value of num_tile_rows_minus1 of the layer with the particular value of nuh_layer_id greater than 0 is constrained to be greater than or equal to the value of num_tile_rows_minus1 of any direct reference layers of that layer.

FIGS. 10A and 10B are conceptual diagrams illustrating co-existence of tiles and WPP across different layers of video data. In particular, FIG. 10A illustrates a configuration in which a picture 80 in the base layer (BL) is processed with WPP, and is not partitioned into tiles, and a picture 82 in the enhancement layer (EL) is partitioned into tiles 84A-84D, but is not processed with WPP. FIG. 10B illustrates a configuration in which a picture 86 in the base layer (BL) is partitioned into tiles 88A-88D, but not processed with WPP, and a picture 90 in the enhancement layer (EL) is processed with WPP, but not partitioned into tiles.

The respective use of tiles and WPP in different layers, e.g. as illustrated in FIGS. 10A and 10B, may lead to inefficient parallel coding. Any coding loss, delays, or other coding inefficiencies that may be introduced by each of tiles and WPP, as well as any delays and inefficiencies that may result from the use of tiles and WPP in different layers that depend on each other, may cumulatively occur during the coding of the plurality of layers with such configurations. However, each layer may only achieve the coding efficiency or fidelity benefits of tiles or WPP. Accordingly, in some examples, the techniques described herein disallow such configurations, among others, to reduce design and implementation complexity. For example, techniques are described herein to constrain the bitstream, e.g., to constrain syntax information within the bitstream, to disallow configurations where a reference layer includes one of tiles or WPP, and the dependent layer includes the other of tiles or WPP.

In some examples, a conforming bitstream shall obey any one or more of the following constraints:

a) All PPSs that may be activated within a coded video sequence (CVS) shall have the same value of entropy_coding_sync_enabled_flag. [Note: This disallows the use of WPP in one layer but not in another layer.]

b) Within a CVS, when tiles_enabled_flag is equal to 0 for an active picture parameter set (PPS) for a particular layer, tiles_enabled_flag shall also be equal to 0 for an active PPS for any particular layer directly or indirectly depends on as specified by the VPS. [Note: This disallows the use of tiles in a lower layer but not in a higher layer that depends on the lower layer, but it would allow for the use of tiles in a spatial enhancement layer but not in the base layer.]

c) Within a CVS, when tiles_enabled_flag is equal to 1 for an active PPS for a particular layer, entropy_coding_ sync_enabled_flag shall be equal to 0 for all PPSs that may be activated. [Note: This disallows the use of WPP in any layer of a CVS when one layer in the CVS uses tiles.]
d) Within a CVS, when entropy_coding_sync_enabled_flag is equal to 1 for an active PPS for a particular layer, tiles_enabled_flag shall be equal to 0 for all PPSs that may be activated. [Note: This disallows the use of tiles in any layer of a CVS when one layer in the CVS uses WPP.]

In some examples, a conforming bitstream shall obey any one or more of the following constraints:
a) When an active PPS of current layer has tiles_enabled_flag is equal to 1 and entropy_coding_sync_enabled_flag=0, the active PPS's corresponding to all of its active reference layer shall have entropy_coding_sync_enabled_flag equal to 0 within a CVS.
b) When an active PPS of current layer has entropy_coding_sync_enabled_flag is equal to 1 and tiles_enabled_flag is equal to 0, the active PPS's corresponding to all of its active reference layer shall have tiles_enabled_flag equal to 0 within a CVS.
c) When an active PPS corresponding to at least one of its active reference layer of current layer has tiles_enabled_flag is equal to 1, the active PPS's of current layer shall have tiles_enabled_flag equal to 1 within a CVS.
d) When an active PPS corresponding to at least one of its active reference layer of current layer has entropy_coding_sync_enabled_flag is equal to 1, the active PPS's of current layer shall have entropy_coding_sync_enabled_flag equal to 1 within a CVS.

Accordingly, in some examples, when video encoder 20 encodes syntax information regarding the use of tiles or WPP in a plurality of layers of video data, video encoder 20 constrains the syntax information, such as the example constraints on syntax information identified above, to disallow configurations where a reference layer includes one of tiles or WPP, and a dependent layer includes the other of tiles or WPP. In some examples, when video decoder 30 decodes an encoded video bitstream, the syntax information, such as the example syntax information identified above, is constrained as discussed above to disallow configurations where a reference layer includes one of tiles or WPP, and a dependent layer includes the other of tiles or WPP.

In some examples, video coders, e.g., video encoder 20 and/or video decoder 30, may also implement techniques for cross-layer alignment of loop filtering across tiles. When a video coder uses tiles, the video coder may either allow or disallow loop filters to cross tile boundaries, as discussed above. Loop filtering across tile boundaries may affect the parallelism afforded by tiles and introduces a delay, but may result in improved video quality. However, when a video coder uses tiles across layers for parallelism, if the video coder allows loop filtering across tile boundaries for some layers and not others, the coding of all layers may be delayed without all layers having any improved video quality resulting from loop filtering.

According to some example techniques of this disclosure, a video coder either allows or disallows loop filtering across tile boundaries for a plurality of layers, e.g., all layers of a video bitstream or sub-bitstream, as mixing whether loop filtering is enabled for different layers may defeat the purpose of the allowance for some of the layers. For example, techniques are described herein to constrain the bitstream, e.g. constrain syntax information within the bitstream, such that loop filtering across tile boundaries is either enabled or not enabled for each of a plurality of layers, e.g., all layers, of the video data.

In some examples, a conforming bitstream shall obey the following constraint:
All PPSs that may be activated within a coded video sequence (CVS) shall have the same value of loop_filter_across_tiles_enabled_flag.

In some examples, a conforming bitstream shall obey one or both of the following constraints:
a) When an active PPS corresponding to at least one of its active reference layer of current layer has loop_filter_across_tiles_enabled_flag is equal to 1, the active PPS's of current layer shall have loop_filter_across_tiles_enabled_flag equal to 1 within a CVS.
b) When an active PPS of current layer has loop_filter_across_tiles_enabled_flag is equal to 0, the active PPS's corresponding to its active reference layer shall have loop_filter_across_tiles_enabled_flag equal to 0 within a CVS.

Accordingly, in some examples, when video encoder 20 encodes syntax information regarding whether loop filtering across tile boundaries is allowed in a plurality of layers of video data, e.g., encodes a value of loop_filter_across_tiles_enabled_flag, video encoder 20 constrains the syntax information to either allow or disallow loop filtering across tile boundaries for the plurality of layers, e.g., all of the layers, of video data. For example, video encoder 20 may constrain the value of loop_filter_across_tiles_enabled_flag to be the same in all active PPSs, such as the active PPSs for the current layer and its active reference layers. In some examples, when video decoder 30 decodes an encoded video bitstream, the syntax information, such as the syntax information identified above, is constrained as discussed above to disallow to either allow or disallow loop filtering across tile boundaries for the plurality of layer, e.g., all of the layers, of video data. For example, the value of loop_filter_across_tiles_enabled_flag may be constrained to be the same in all active PPSs, such as the active PPSs for the current layer and its active reference layers.

Figure 11:
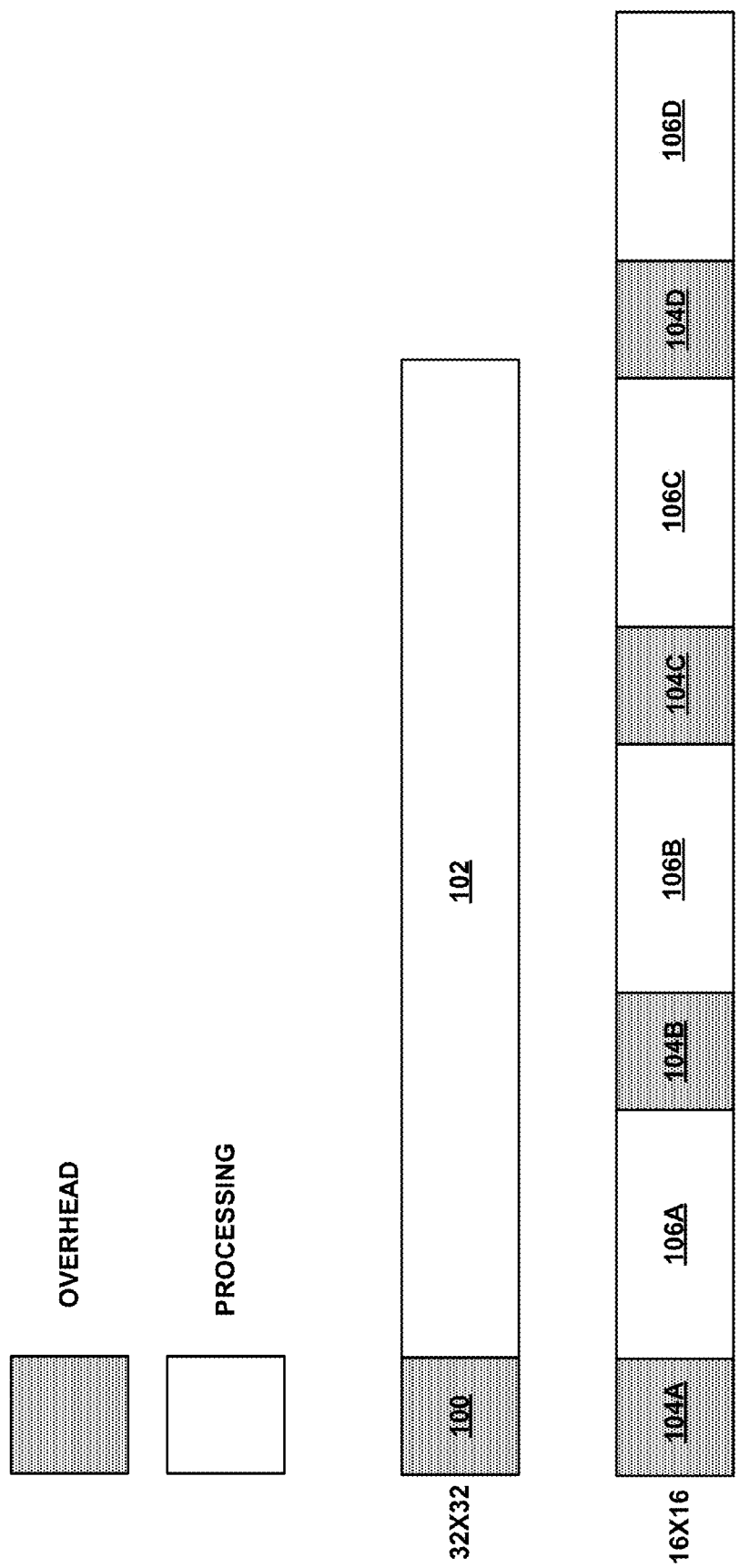
FIG. 11 is a conceptual diagram illustrating an example of processing time and overhead for different largest coding unit sizes.

FIG. 11 is a conceptual diagram illustrating an example of processing time and overhead for different LCU (or CTB) sizes. HEVC supports three LCU sizes: 16×16, 32×32 and 64×64. These sizes represent a trade-off between coding efficiency (larger LCU or CTB) and encoder/decoder latency (smaller LCU or CTB).

However, the small LCU or CTB size comes with a cost to pipelined decoders. Specifically, every pipeline stage has a certain amount of overhead per LCU or CTB for initialization and setup. In Wan et al., "Adding a Level Restriction on Coding Tree Block Size" JCT-VC of ITU-T SG 16 WP 3 and ISO/TEC JTC 1/SC 29/WG 11, 10th Meeting: Stockholm, SE, 11-20 Jul. 2012 (hereinafter "JSTVC-J0334"), it was asserted that there may be four times the overhead time when coding a 32×32 block of video data as four 16×16 LCUs versus one 32×32 LCU, and that the cumulative overhead for use of 16×16 LCUs can represent up to a 10% increase in overall worst-case decode time as compared to use of 32×32 LCUs. JSTVC-J0334 is available for download from http://phenix.it-sudparis.eu/jct/doc_end_user/current_document.php?id=6197.

In the example of FIG. 11, the time associated with overhead for processing a block of video data is illustrated by shaded blocks, and the time associated with processing the video data of the block is illustrated by non-shaded blocks. In the example of FIG. 11, the processing a 32×32 video block includes one overhead processing period 100, and a period 102 during which the video data of the 32×32 block is processed. In the example of FIG. 11, processing the 32×32 block as four 16×16 blocks of video data results in four processing periods 104A-104D (collectively, "processing times 104") and four periods 106A-106D for processing the video data of the 16×16 video blocks (collectively, "video data processing periods 106"). Overhead period 100 has a similar, or the same, length in time as overhead periods 104. Consequently, although the video data processing periods 106 for the 16×16 blocks may be shorter than video data processing period 102 for the 32×32 block, processing a 32×32 block as four 16×16 blocks takes a greater length of time overall due to the four overhead periods 104.

Figure 12:
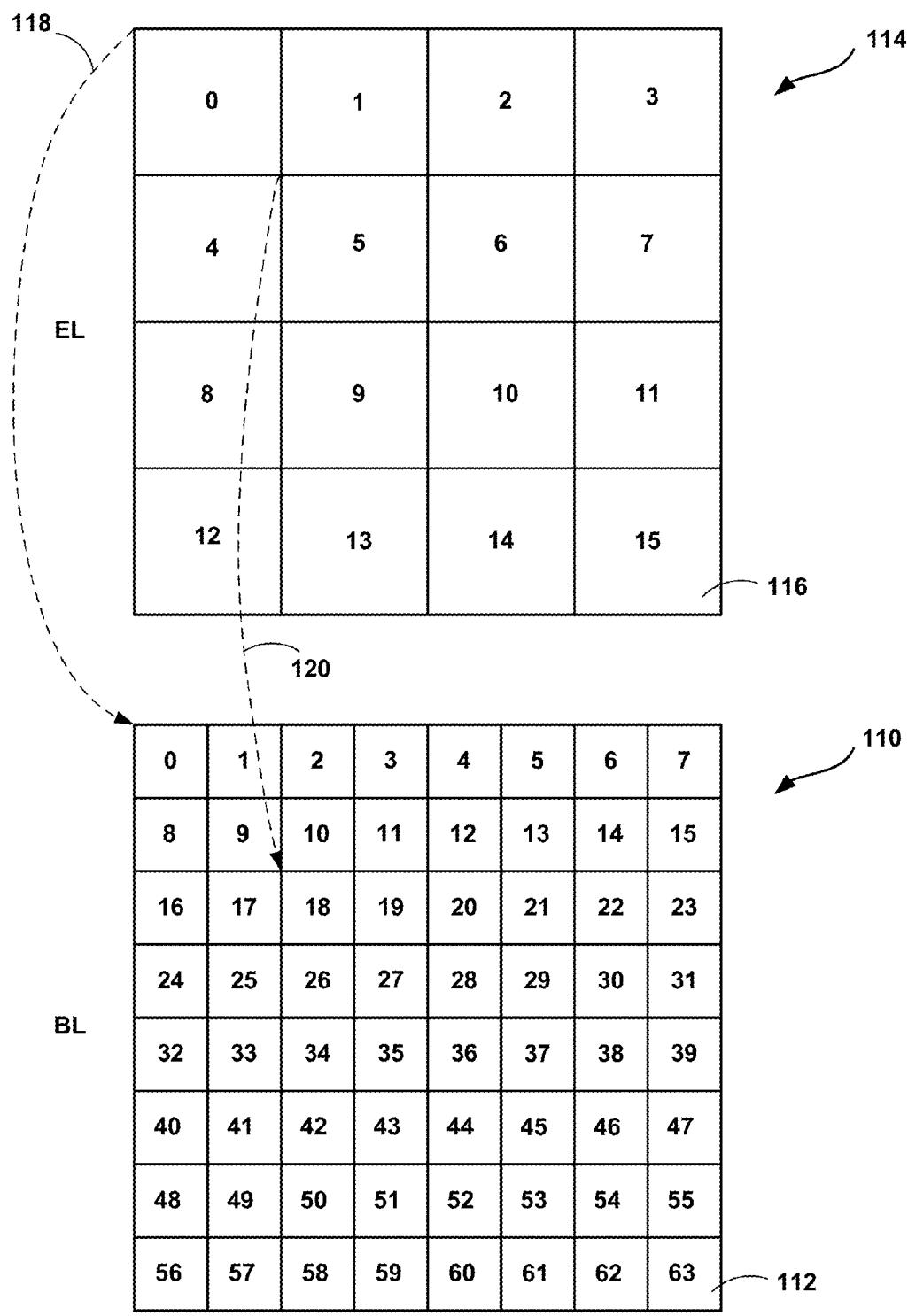
FIG. 12 is a conceptual diagram illustrating example pictures in different layers of video data having different largest coding unit sizes.

FIG. 12 is a conceptual diagram illustrating example pictures in different layers of video data having different LCU or CTB sizes. In particular, FIG. 12 illustrates a picture 110 in the base layer (BL) have a plurality of LCUs 112 with a first, smaller LCU size, and a picture 114 in an enhancement layer (EL) having a plurality of LCUs 116 having a second, larger LCU size. Only one each of LCUs 112 and 116 are labeled in FIG. 12, for ease of illustration. LCUs 112 and 116 are labeled numerically (i.e., 0, 1, 2, etc.) according to the raster scan order for LCUs. Additionally, lines 118 and 120 in FIG. 12 illustrate the corresponding locations within pictures 112 and 114, and thus the four LCUs 112 (labeled 0, 1, 8, and 9) in picture 110 that correspond to one LCU 116 (labeled 0), in picture 114.

Video coders that employ LCU synchronous encoding or decoding of video data having multiple layers with different LCU sizes across different layers, as shown in FIG. 12, may encounter a number of problems. The problems may be especially evident when the resolution of the different layers is the same, e.g., as is the case for SNR scalability using multiple layers. For example, a layer with a smaller LCU size, e.g., BL in the example of FIG. 12, may have a longer coding time for each LCU, as illustrated in FIG. 11. Consequently, the layer with the smaller coding size may be a bottleneck for the encoding or decoding of LCUs in all layers having larger LCU sizes, e.g. EL in the example of FIG. 12. The layer with the smaller LCU size may thus determine the worst case coding time.

For example, with reference to FIG. 12, one LCU 116 in the EL (e.g., the LCU labeled 0 in the EL) can complete faster than one LCU 112 in the BL (e.g., the LCU labeled 0 in the BL), but may still need to wait for one or more LCUs in the BL (e.g., the LCUs labeled 1, 8 and 9 in the BL) that are reference LCUs for the LCUs in the EL, e.g., for synchronous encoding or decoding of video data having multiple layers for SNR scalability. Additionally, different LCU sizes in different layers may make it more difficult for a video coder to map the locations of collocated blocks, e.g., LCUs, between layers, e.g., to identify a reference block in a reference layer.

Accordingly, in some examples, a video coder constrains the bitstream, e.g., constrains syntax information in the bitstream, such that the LCU size of one layer is constrained based on the LCU size of another layer, e.g., such that the LCU sizes of different layers are equal. In some examples, a video coder constrains the bitstream such that the LCU size of one layer is constrained based on the LCU size of another layer, e.g., such that the LCU sizes of different layers are equal, when a spatial resolution of pictures in the first and second layers are the same. In some examples, a video coder constrains the bitstream such that the LCU size of a current layer is based upon, e.g., equal to, the LCU size of its active reference layer(s), e.g., for SNR scalability. In some examples, a conforming bitstream shall obey the following constraints:

In other words the CTB size of current layer shall be equal to the CTB size of its active reference layers for SNR scalability.

In one example in which a video coder constrains the bitstream such that the LCU size of a current layer is based upon, e.g., equal to, the LCU size of its active reference layer(s) for SNR scalability the specification text may be as follows:

Let the variables PicWidthInSamplesL and PicHeightInSamplesL be set equal to width and height of current layer picture in units of luma samples, respectively and let the variables RefLayerPicWidthInSamplesL and RefLayerPicHeightInSamplesL be set equal to the width and height of the decoded active reference layer picture in units of luma samples, respectively. The variables ScaledRefLayerLeftOffset, ScaledRefLayerTopOffset, ScaledRefLayerRightOffset and ScaledRefLayerBottomOffset are derived as follows:

ScaledRefLayerLeftOffset=scaled_ref_layer_left_offset [dRlIdx]<<1

ScaledRefLayerTopOffset=scaled_ref_layer_top_offset [dRlIdx]<<1

ScaledRefLayerRightOffset=scaled_ref_layer_right_offset[dRlIdx]<<1

ScaledRefLayerBottomOffset=scaled_ref_layer_bottom_offset[dRlIdx]<<1

Let the variable RefLayerCtbLog2SizeY be set equal to the CtbLog2SizeY of the decoded active reference layer picture.

When PicWidthInSamplesL of current layer is equal to RefLayerPicWidthInSamplesL and PicHeightInSamplesL of current layer is equal to RefLayerPicHeightInSamplesL and the values of ScaledRefLayerLeftOffset, ScaledRefLayerTopOffset, ScaledRefLayerRightOffset and ScaledRefLayerBottomOffset are all equal to 0, then CtbLog2SizeY of current layer shall be equal to the RefLayerCtbLog2SizeY.

Accordingly, in some examples, when video encoder 20 encodes syntax information regarding the largest LCU size, e.g., encodes one or more values in an SPS for determining CtbLog2SizeY, video encoder 20 constrains the syntax information such that the LCU size of a current layer is equal to the LCU size of its active reference layer(s), e.g., when a spatial resolution of pictures in the layers is equal and/or for SNR scalability. In some examples, when video decoder 30 decodes an encoded video bitstream, the syntax information regarding the largest LCU size, e.g., syntax information in an SPS for determining CtbLog2SizeY, is constrained such that the LCU size of a current layer is equal to the LCU size of its active reference layer(s), e.g., when a spatial resolution of pictures in the layers is equal and/or for SNR scalability.

The HEVC standard specifies a maximum number of tiles per picture based on a spatial resolution of the picture. In particular, Table A-1 in HEVC specification specifies the maximum number of tiles per picture for different bitstream levels, where each bitstream level defines a spatial resolution, e.g., in luma samples. Each bitstream level also specifies a maximum number of tile rows and a maximum number of tile columns, which collectively specify the maximum number of tiles. Table A-1 of the HEVC specification is reproduced below.

TABLE A-1

General tier and level limits

| Level | Max luma picture size MaxLumaPs (samples) | Max CPB size MaxCPB (1000 bits) Main tier | Max CPB size MaxCPB (1000 bits) High tier | Max slice segments per picture MaxSliceSegmentPerPicture | Max # of tile rows MaxTileRows | Max # of tile columns MaxTileCols |
|---|---|---|---|---|---|---|
| 1 | 36864 | 350 | — | 16 | 1 | 1 |
| 2 | 122880 | 1500 | — | 16 | 1 | 1 |
| 2.1 | 245760 | 3000 | — | 20 | 1 | 1 |
| 3 | 552960 | 6000 | — | 30 | 2 | 2 |
| 3.1 | 983040 | 10000 | — | 40 | 3 | 3 |
| 4 | 2228224 | 12000 | 30000 | 75 | 5 | 5 |
| 4.1 | 2228224 | 20000 | 50000 | 75 | 5 | 5 |
| 5 | 8912896 | 25000 | 100000 | 200 | 11 | 10 |
| 5.1 | 8912896 | 40000 | 160000 | 200 | 11 | 10 |
| 5.2 | 8912896 | 60000 | 240000 | 200 | 11 | 10 |
| 6 | 35651584 | 60000 | 240000 | 600 | 22 | 20 |
| 6.1 | 35651584 | 120000 | 480000 | 600 | 22 | 20 |
| 6.2 | 35651584 | 240000 | 800000 | 600 | 22 | 20 |

In some examples, the techniques of this disclosure include constraining, for each of a plurality of layers of video data, the syntax information defining the partitioning of a picture within a layer into a number of tiles. In some examples, the syntax information is constrained such that the number of tiles per picture for each layer of the plurality of layers is determined based on a maximum number of tiles per picture for the layer. The maximum number of tiles per picture for each layer may be determined based on a spatial resolution for the picture and/or tier and level information for the picture, e.g., the maximum number of tiles for a lowest bitstream level in Table A-1 of the HEVC specification that allows the spatial resolution for the layer. The respective syntax information for each layer may include respective values of a first syntax element defining a number of tile columns and a second syntax element defining a number of tile rows, and the maximum number of tiles per picture for each layer of the plurality of layers is defined by a maximum number of tile columns and a maximum number of tile rows per picture for each layer of the plurality of layers.

In some examples, a video coder constrains the syntax information such that the number of tiles per picture for each layer of the plurality of layers is no greater than the maximum number of tiles per picture for the layer. For example, a video coder may constrain the syntax information as follows:

For a particular layer with nuh_layer_id equal to currLayerId, and currLayerId greater than 0, the value of num_tile_columns_minus1[currLayerId] shall be less than MaxTileCols and the value of num_tile_rows_minus1[currLayerId] shall be less than MaxTileRows, where MaxTileCols and MaxTileRows are specified in Table A-1 for the level that is the lowest level in Table A-1 that allows for the spatial resolution of that particular layer with nuh_layer_id equal to currLayerId.

In some examples, a video coder constrains the syntax information such that a sum of the numbers of tiles per picture for the plurality of layers is no greater than a sum of the maximum numbers of tiles per picture for the plurality of layers. In such examples, the number of tiles per picture for a first layer of the plurality of layers may be greater than a maximum number of tiles per picture for the layer, and the number of tiles per picture for a second layer of the plurality of layers may be less than a maximum number of tiles per picture for the layer. In some examples, the pictures within the plurality of layers comprise pictures within an access unit, e.g., as illustrated in FIG. 4. In some examples, a video coder constrains the syntax information such that a sum of the numbers of tiles per picture for a plurality of layers of a sub-bitstream is no greater than a sum of the maximum numbers of tiles per picture for the plurality of layers in the sub-bitstream. The sub-stream may be a subset of the bitstream that comprises a subset of the layers in bitstream.

The respective syntax information for each layer of the plurality of layers may comprise respective values of a first syntax element defining a number of tile columns per picture and a second syntax element defining a number of tile rows per picture. The maximum number of tiles per picture for each layer of the plurality of layers may be defined by a maximum number of tile columns per picture and a maximum number of tile rows per picture for each layer of the plurality of layers. The maximum numbers of tile rows and columns for a layer may be determined based on the resolution and/or tier and level information of the layer, e.g., as specified in Table A-1 of the HEVC specification. In other words, the maximum allowed tiles per picture for a particular layer when NumDirectRefLayers is equal to zero may be specified by Table A-1 for the level that is the lowest level in Table A-1 that allows for the spatial resolution of that particular layer with nuh_layer_id equal to currLayerId.

In some examples, e.g., when a layer is a non-base layer, a video coder may constrain the syntax information such that the number of tile columns per picture for one layer of the plurality of layers is no greater than a sum of the maximum number of tile columns per picture for the layer and a number of remaining tile columns for the layer, and the number of tile rows per picture for the layer is no greater than a sum of the maximum number of tile rows per picture for the layer and a number of remaining of tile rows for the layer. The number of remaining tile columns for the layer may comprise a sum of differences between the maximum number of tiles columns and the number of tile columns for one or more other layers of the plurality of layers, and the number of remaining tile rows for the layer comprises a sum of differences between the maximum number of tile rows and the number of tile rows for the one or more other layers of the plurality of layers. In some examples, a video coder may constrain the syntax information as follows:

1) The maximum number of tiles rows and columns in an access unit shall be less than or equal to the sum of the maximum allowed tiles rows and columns, respectively, in each layer when NumDirectRefLayers is equal to zero.

2) The Maximum number of tiles for any sub-bitstreams shall be less than or equal to the sum of the maximum allowed tiles in each layer when NumDirectRefLayers is equal to zero that is present in the sub-bitstream.

In some examples, the specification text could be as follows:

--- a) The value of num_tile_columns_minus1 of current layer with a particular nuh_layer_id, currLayerId, greater than zero shall be less than MaxLayerTileCols[ currLayerId ] + RemainingTilesCols[ currLayerId ] where RemainingTiles[ currLayerId ]is calculated as
RemainingTilesCols [ currLayerId ] = 0;
for( i = 0; i < NumActiveRefLayerPics−1; i++ ) {
refLayerId = LayerIdxInVps[ RefPicLayerId[ i ] ];
RemainingTilesCols [ currLayerId ] +=MaxLayerTileCols[ refLayerId ] − num_tile_columns_minus1[ refLayerId ];
}
b) The value of num_tile_rows_minus1 of current layer with a particular nuh_layer_id , currLayerId, greater than zero shall be less than MaxLayerTileRows [currLayerId] + RemainingTilesrows[currLayerId ] where RemainingTilesRows[currLayerId] is calculated as
RemainingTilesCols [ currLayerId ] = 0;
for( i = 0; i < NumActiveRefLayerPics−1; i++ ) {
refLayerId = LayerIdxInVps[ RefPicLayerId[ i ] ];
RemainingTilesRows [ currLayerId ] += MaxLayerTileRows [ refLayerId ] − num_tile_rows_minus1[ refLayerId ];
}

---

Accordingly, in some examples, when video encoder 20 encodes syntax information regarding respective numbers of tiles per picture for a plurality layers, video encoder 20 may constrain the syntax information as described above. In some examples, when video decoder 30 decodes an encoded video bitstream, the syntax information regarding the respective numbers of tiles per picture for a plurality of layers may be constrained as described above.

In some of the examples described herein, syntax information is constrained to achieve the bitstream constraints. For example, values of certain syntax elements may be constrained. The syntax information, e.g., values of syntax elements, may be encoded, e.g., by video encoder 20, and decoded, by video decoder 30. In some examples, the syntax elements may include in a parameter set. Although the example syntax elements highlighted above may be included in a PPS or SPS, as described with respect to certain examples, such syntax elements may be included in any parameter set, e.g., a sequence parameter a video parameter set (VPS), or adaptation parameter set (APS) in other examples. Additionally, in some examples, syntax information may be included in the bitstream in elements other than parameter sets, such as slice headers or supplemental enhancement information (SEI) messages.

Figure 13:
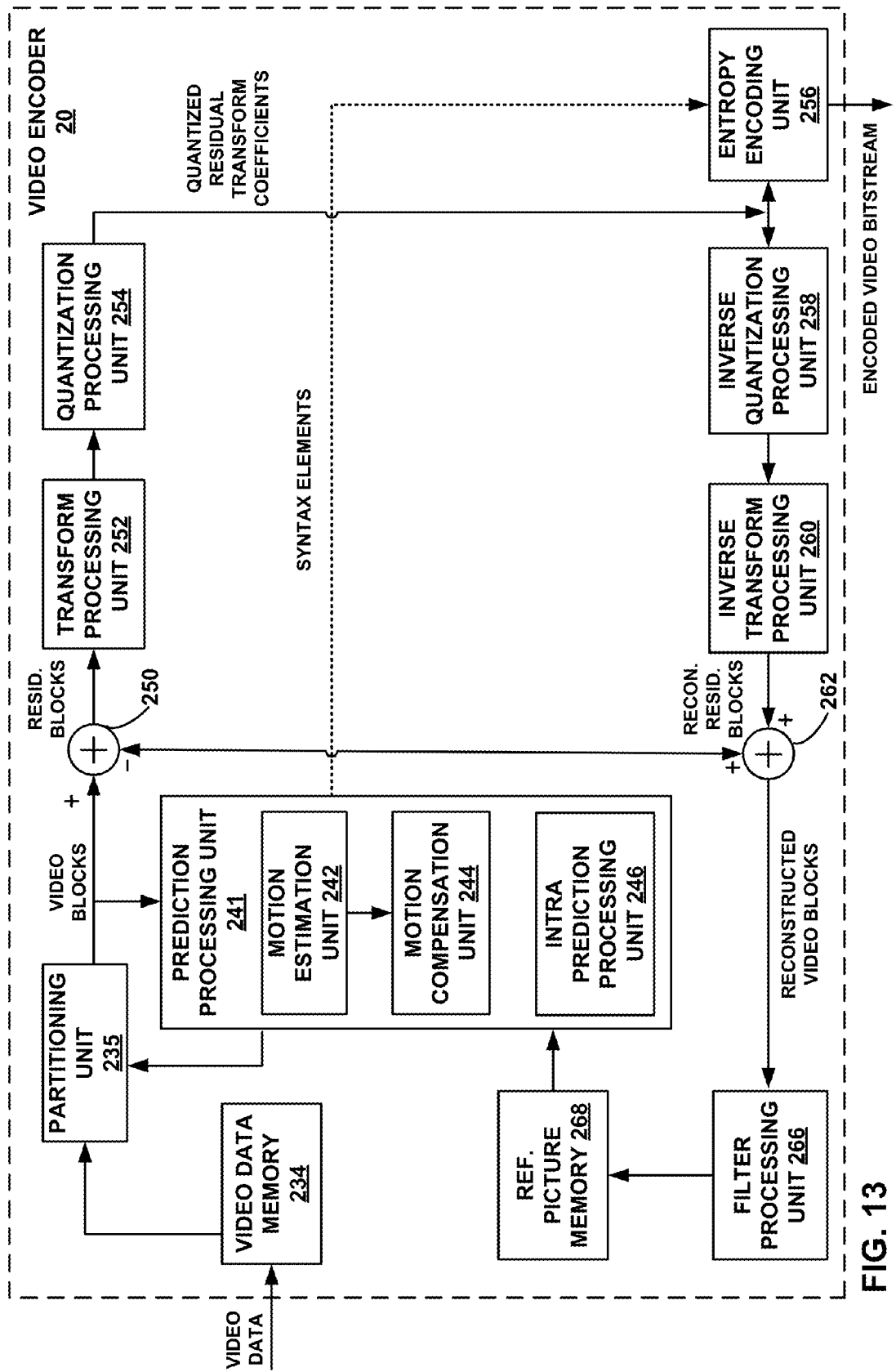
FIG. 13 is a block diagram illustrating an example video encoder that encodes a video bitstream according to the restrictions or constraints described in this disclosure.

FIG. 13 is a block diagram illustrating an example video encoder 20 that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 13, video encoder 20 includes a video data memory 234, a partitioning unit 235, prediction processing unit 241, reference picture memory 268, summer 250, transform processing unit 252, quantization processing unit 254, and entropy encoding unit 256. Prediction processing unit 241 includes motion estimation unit 242, motion compensation unit 244, and intra prediction processing unit 246.

Video data memory 234 may store video data to be encoded by the components of video encoder 20. The video data stored in video data memory 234 may be obtained, for example, from video source 18. Reference picture memory 268 may be a reference picture memory that stores reference video data for use in encoding video data by video encoder 20, e.g., in intra- or inter-coding modes. Video data memory 234 and reference picture memory 268 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 234 and reference picture memory 268 may be provided by the same memory device or separate memory devices. In various examples, video data memory 234 may be on-chip with other components of video encoder 20, or off-chip relative to those components For video block reconstruction, video encoder 20 also includes inverse quantization processing unit 258, inverse transform processing unit 260, and summer 262. Video encoder 20 also includes a filter processing unit 266 to filter the output of summer 262, e.g., reconstructed video blocks, prior to storage in reference picture memory 268. Filter processing unit 266 may include a deblocking filter that filters block boundaries to remove blockiness artifacts from reconstructed video. Filter processing unit 266 may apply additional loop filters (in-loop or post loop), such as sample adaptive offset (SAO) filters.

In various examples, a unit of video encoder 20 may be tasked to perform the techniques of this disclosure. Also, in some examples, the techniques of this disclosure may be divided among one or more of the units of video encoder 20. For example, any one or more of partitioning unit 235, prediction processing unit 241, and entropy encoding unit 256 may perform one or more of the techniques described herein.

As shown in FIG. 13, video encoder 20 receives video data, and partitioning unit 235 partitions the data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. Partitioning unit 235 may perform techniques described herein for partitioning pictures in different layers into respective numbers of tiles, and for partitioning pictures in various layers into LCUs having an LCU size. Partitioning unit 235, prediction processing unit 241, and/or entropy coding unit may generate syntax information, which may be constrained as described herein, regarding the partitioning of pictures in a plurality layers into respective numbers of tiles, and regarding the LCU size for a plurality of layers.

Prediction processing unit 241 may select one of a plurality of possible coding modes, such as one of a plurality of intra coding modes or one of a plurality of inter coding modes, for the current video block based on error results (e.g., coding rate and the level of distortion). Prediction processing unit 241 may provide the resulting intra- or inter-coded block to summer 250 to generate residual block data and to summer 262 to reconstruct the encoded block for use as a reference picture.

Intra prediction unit 246 within prediction processing unit 241 may perform intra-predictive coding of the current video block relative to one or more neighboring blocks in the same frame or slice as the current block to be coded to provide spatial compression. Motion estimation unit 242 and motion compensation unit 244 within prediction processing unit 241 perform inter-predictive coding of the current video block relative to one or more predictive blocks in one or more reference pictures, e.g., to provide temporal compression.

Motion estimation unit 242 may be configured to determine the inter-prediction mode for a video slice according to a predetermined pattern for a video sequence. Motion estimation unit 242 and motion compensation unit 244 may be highly integrated, but are illustrated separately for conceptual purposes. Motion estimation, performed by motion estimation unit 242, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 264. For example, video encoder 20 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

Motion estimation unit 242 calculates a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 264. Motion estimation unit 242 sends the calculated motion vector to entropy encoding unit 256 and motion compensation unit 246.

Motion compensation, performed by motion compensation unit 244, may involve fetching or generating the predictive block based on the motion vector determined by motion estimation, possibly performing interpolations to sub-pixel precision. Upon receiving the motion vector for the PU of the current video block, motion compensation unit 244 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 250 represents the component or components that perform this subtraction operation. Motion compensation unit 244 may also generate syntax elements associated with the video blocks and the video slice for use by video decoder 30 in decoding the video blocks of the video slice.

Intra-prediction processing unit 246 may intra-predict a current block, as an alternative to the inter-prediction performed by motion estimation unit 242 and motion compensation unit 244, as described above. In particular, intra-prediction processing unit 246 may determine an intra-prediction mode to use to encode a current block. In some examples, intra-prediction processing unit 246 may encode a current video block using various intra-prediction modes, e.g., during separate encoding passes, and intra-prediction unit 246 (or prediction processing unit 241, in some examples) may select an appropriate intra-prediction mode to use from the tested modes. For example, intra-prediction processing unit 246 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 246 may calculate ratios from the distortions and rates for the various encoded blocks to determine which intra-prediction mode exhibits the best rate-distortion value for the block.

In any case, after selecting an intra-prediction mode for a block, intra-prediction processing unit 246 may provide information indicative of the selected intra-prediction mode for the block to entropy encoding unit 256. Entropy encoding unit 256 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 241 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 252. Transform processing unit 252 transforms the residual video data into residual transform coefficients using a transform, such as a discrete cosine transform (DCT) or a conceptually similar transform. Transform processing unit 252 may convert the residual video data from a pixel domain to a transform domain, such as a frequency domain.

Transform processing unit 252 may send the resulting transform coefficients to quantization processing unit 254. Quantization processing unit 254 quantizes the transform coefficients to further reduce bit rate. The quantization process may reduce the bit depth associated with some or all of the coefficients. The degree of quantization may be modified by adjusting a quantization parameter. In some examples, quantization processing unit 254 may then perform a scan of the matrix including the quantized transform coefficients. Alternatively, entropy encoding unit 256 may perform the scan.

Following quantization, entropy encoding unit 256 entropy encodes the quantized transform coefficients. For example, entropy encoding unit 256 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 256, the encoded video bitstream may be transmitted to video decoder 30, or archived for later transmission or retrieval by video decoder 30. Entropy encoding unit 256 may also entropy encode the motion vectors and the other syntax elements for the current video slice being coded.

Inverse quantization processing unit 258 and inverse transform processing unit 260 apply inverse quantization and inverse transformation, respectively, to reconstruct the residual block in the pixel domain for later use as a reference block of a reference picture. Motion compensation unit 244 may calculate a reference block by adding the residual block to a predictive block of one of the reference pictures within one of the reference picture lists. Motion compensation unit 244 may also apply one or more interpolation filters to the reconstructed residual block to calculate sub-integer pixel values for use in motion estimation. Summer 262 adds the reconstructed residual block to the motion compensated prediction block produced by motion compensation unit 244 to produce a reference block for storage in reference picture memory 264. The reference block may be used by motion estimation unit 242 and motion compensation unit 244 as a reference block to inter-predict a block in a subsequent video frame or picture.

Video encoder 20 may be configured to perform in of the techniques described herein. For example, partitioning unit 235 may partition respective pictures in a plurality of layers into numbers of tiles and LCUs having LCU sizes as described herein, and partitioning unit 235, prediction processing unit 241, and/or entropy encoding unit 256 may generate syntax information that is constrained as described herein.

In this manner, video encoder 20 is an example of a video encoder that performs a method for encoding video data comprising a plurality of layers that comprises partitioning a picture in each layer of the plurality of layers of the video data into a number of tiles per picture for the layer, wherein partitioning the picture into the number of tiles comprises determining a maximum number of tiles per picture for the layer based on at least one of a spatial resolution, tier information, or level information for the picture in the layer, and constraining the number of tiles per picture for the layer based on the maximum number of tiles per picture for the layer. The method further comprises encoding the picture in each layer of the plurality of layers based on the partitioning of the picture into the number of tiles per picture for the layer, and encoding respective syntax information for each layer of the plurality of layers of the video data, the respective syntax information for each layer of the plurality of layers defining the partitioning of the picture in the layer into the number of tiles per picture for the layer. In some examples, video encoder 20 determines the maximum number of tiles per picture for the layer by determining a maximum number of tiles per picture for a lowest bitstream level that allows the spatial resolution for the layer. In some examples, video encoder 20 constrains the number of tiles per picture for each layer of the plurality of layers to be no greater than the maximum number of tiles per picture for the layer.

In some examples, video encoder 20 constrains the number of tiles per picture for each layer of the plurality of layers such that a sum of the numbers of tiles per picture for the plurality of layers is no greater than a sum of the maximum numbers of tiles per picture for the plurality of layers. In some examples, video encoder 20 constrains the number of tiles per picture for each layer of the plurality of layers such that the number of tiles per picture for a first layer of the plurality of layers is greater than a maximum number of tiles per picture for the first layer, and the number of tiles per picture for a second layer of the plurality of layers is less than a maximum number of tiles per picture for the second layer. In some examples, the respective syntax information for each layer of the plurality of layers comprises respective values of a first syntax element defining a number of tile columns per picture and a second syntax element defining a number of tile rows per picture, and the maximum number of tiles per picture for each layer of the plurality of layers is defined by a maximum number of tile columns per picture and a maximum number of tile rows per picture for each layer of the plurality of layers. In some examples, video encoder 20 constrains the number of tiles per picture for each layer of the plurality of layers such that the number of tile columns per picture for one layer of the plurality of layers is no greater than a sum of the maximum number of tile columns per picture for the layer and a number of remaining tile columns per picture for the layer, and the number of tile rows per picture for the layer is no greater than a sum of the maximum number of tile rows per picture for the layer and a number of remaining tile rows per picture for the layer. In some examples, video encoder 20 determines a sum of differences between the maximum number of tiles columns per picture and the number of tile columns per picture for one or more other layers of the plurality of layers as the number of remaining tile columns per picture for the layer, and determines a sum of differences between the maximum number of tile rows per picture and the number of tile rows per picture for the one or more other layers of the plurality of layers as the number of remaining tile rows per picture for the layer.

In some examples, an apparatus comprising a video encoder, such as video encoder 20, configured encode video data comprising a plurality of layers. The video encoder comprises a memory configured to store an encoded video bitstream that encodes the video data, and one or more processors. The one or more processors are configured to partition a picture in each layer of the plurality of layers of the video data into a number of tiles per picture for the layer. To partition the picture into the number of tiles, the one or more processors are configured to determine a maximum number of tiles per picture for the layer based on at least one of a spatial resolution, tier information, or level information for the picture in the layer, and constrain the number of tiles per picture for the layer based on the maximum number of tiles per picture for the layer. The one or processors are further configured to encode, into the encoded video bitstream, the picture in each layer of the plurality of layers based on the partitioning of the picture into the number of tiles per picture for the layer, and encode, into the encoded video bitstream, respective syntax information for each layer of the plurality of layers of the video data, the respective syntax information for each layer of the plurality of layers defining the partitioning of the picture in the layer into the number of tiles per picture for the layer.

Figure 14:
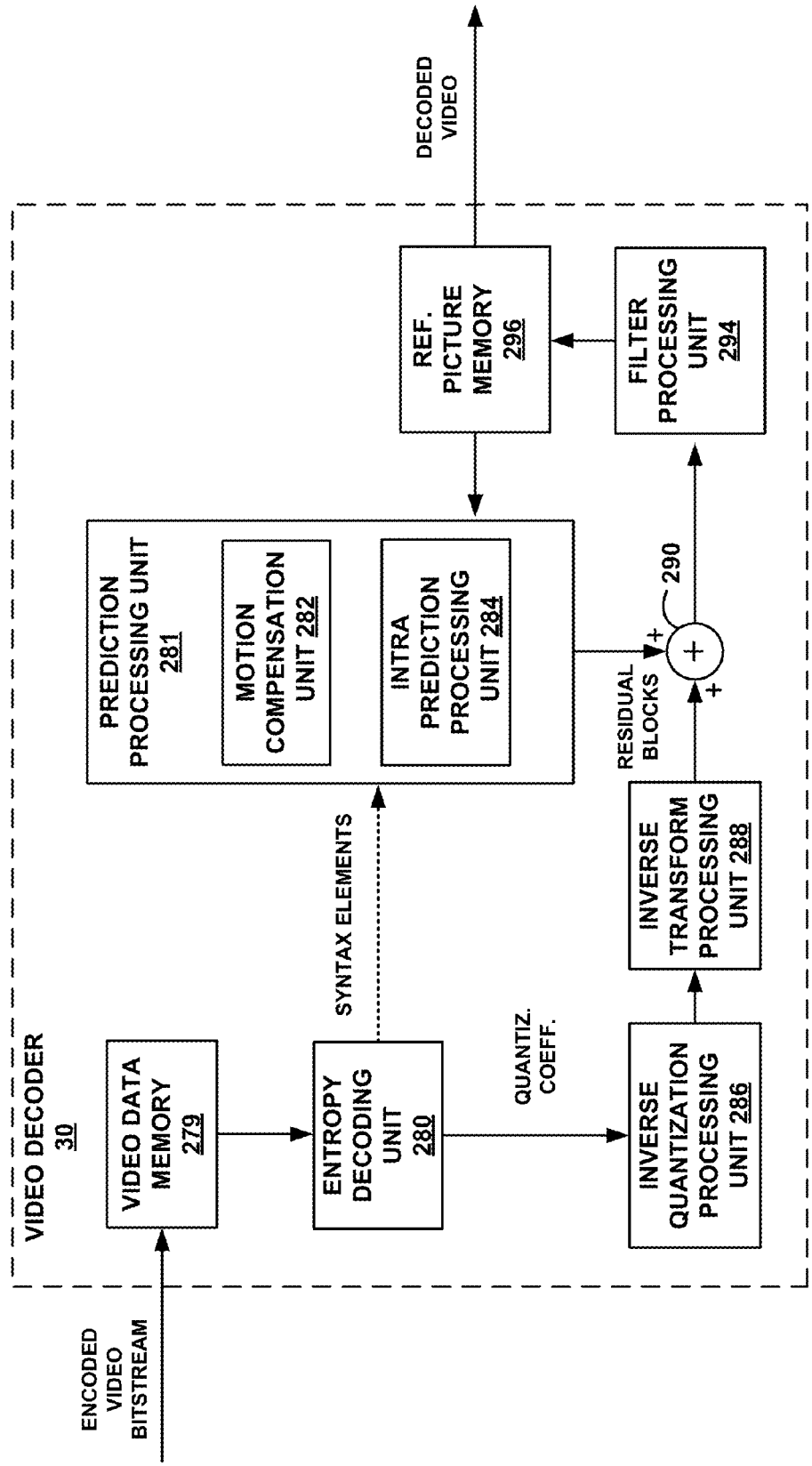
FIG. 14 is a block diagram illustrating an example video decoder that decodes a video bitstream that was encoded according to restrictions or constraints described in this disclosure.

FIG. 14 is a block diagram illustrating an example video decoder 30 that may implement the techniques described in this disclosure. In the example of FIG. 14, video decoder 30 includes an video data memory 279, entropy decoding unit 280, prediction processing unit 281, inverse quantization processing unit 286, inverse transformation unit 288, summer 290, filter processing unit 294, and reference picture memory 296. Prediction processing unit 281 includes motion compensation unit 282 and intra prediction unit 284. Video decoder 30 may, in some examples, perform a decoding pass generally reciprocal to the encoding pass described with respect to video encoder 20 from FIG. 13.

Video data memory 279 may store video data, such as an encoded video bitstream, to be decoded by the components of video decoder 30. The video data stored in video data memory 279 may be obtained, for example, from computer-readable medium 16, e.g., from a local video source, such as a camera, via wired or wireless network communication of video data, or by accessing physical data storage media. Video data memory 279 may form a coded picture buffer (CPB) that stores encoded video data from an encoded video bitstream. Reference picture memory 296 may store reference video data for use in decoding video data by video decoder 30, e.g., in intra- or inter-coding modes. Video data memory 279 and reference picture memory 296 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 279 and reference picture memory 296 may be provided by the same memory device or separate memory devices. In various examples, video data memory 279 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 280 of video decoder 30 entropy decodes the bitstream to generate quantized coefficients, motion vectors, and other syntax elements. Entropy decoding unit 280 forwards the motion vectors and other syntax elements to prediction processing unit 281. Video decoder 30 may receive the syntax elements at the video slice level and/or the video block level.

When the video slice is coded as an intra-coded (I) slice, intra prediction unit 284 of prediction processing unit 281 may generate prediction data for a video block of the current video slice based on a signaled intra prediction mode and data from previously decoded blocks of the current frame or picture. When the video frame is coded as an inter-coded (i.e., B or P) slice, motion compensation unit 282 of prediction processing unit 281 produces predictive blocks for a video block of the current video slice based on the motion vectors and other syntax elements received from entropy decoding unit 280. The predictive blocks may be produced from one of the reference pictures within one of the reference picture lists. Video decoder 30 may construct the reference frame lists, RefPicList0 and RefPicList1, using default construction techniques or any other technique based on reference pictures stored in reference picture memory 292.

Motion compensation unit 282 determines prediction information for a video block of the current video slice by parsing the motion vectors and other syntax elements, and uses the prediction information to produce the predictive blocks for the current video block being decoded. For example, motion compensation unit 282 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 282 may also perform interpolation based on interpolation filters. Motion compensation unit 282 may use interpolation filters as used by video encoder 20 during encoding of the video blocks to calculate interpolated values for sub-integer pixels of reference blocks. In this case, motion compensation unit 282 may determine the interpolation filters used by video encoder 20 from the received syntax elements and use the interpolation filters to produce predictive blocks.

Inverse quantization processing unit 286 inverse quantizes, i.e., dequantizes, the quantized transform coefficients provided in the bitstream and decoded by entropy decoding unit 280. The inverse quantization process may include use of a quantization parameter calculated by video encoder 20 for each video block in the video slice to determine a degree of quantization and, likewise, a degree of inverse quantization that should be applied. Inverse transform processing unit 288 applies an inverse transform, e.g., an inverse DCT, an inverse integer transform, or a conceptually similar inverse transform process, to the transform coefficients in order to produce residual blocks in the pixel domain.

After motion compensation unit 282 generates the predictive block for the current video block based on the motion vectors and other syntax elements, video decoder 30 forms a decoded video block by summing the residual blocks from inverse transform processing unit 288 with the corresponding predictive blocks generated by motion compensation unit 282. Summer 290 represents the component or components that perform this summation operation. Video decoder 30 may also include a filter processing unit 294 to filter the output of summer 290, e.g., reconstructed video blocks, prior to storage in reference picture memory 296. Filter processing unit 294 may include a deblocking filter that filters block boundaries to remove blockiness artifacts from reconstructed video. Filter processing unit 294 may apply additional loop filters (in-loop or post loop), such as SAO filters. Reference picture memory 296 stores reference pictures used for subsequent motion compensation. Reference picture memory 296 also stores decoded video for later presentation on a display device, such as display device 32 of FIG. 1.

In some examples, video decoder 30 comprises a plurality of parallel processing cores, e.g., to process different pictures within different layers in parallel, and/or to process different tiles within a picture in parallel. In such examples, at least some or all of the components of the video decoder 30 illustrated in FIG. 14 may be repeated for each processing core, or may be shared by different processing cores. For example, any of entropy decoding unit 280, motion compensation unit 282, intra-prediction processing unit 284, inverse quantization processing unit 286, inverse transformation processing unit 288, summer 290, filter processing unit 294, and reference picture memory 296 may be repeated for each processing core, or shared by the processing cores. Furthermore, the various functions associated herein with each of entropy decoding unit 280, motion compensation unit 282, intra-prediction processing unit 284, inverse quantization processing unit 286, inverse transformation processing unit 288, summer 290, filter processing unit 294, and reference picture memory 296 may be performed in parallel for video data associated with different tiles in a picture or different pictures within different layers. Parallel processing may include coding at least some portion of the video data associated with the different tiles or layers by respective processing cores at substantially the same time. For parallel processing, the processing cores could, but do not necessarily start or end coding video data at the same time. However, during at least a portion of the parallel processing, the cores are coding simultaneously.

In various examples, a unit of video decoder 30 may be tasked to perform the techniques of this disclosure. Also, in some examples, the techniques of this disclosure may be divided among one or more of the units of video decoder 30. For example, entropy decoding unit 280 may decode an encoded video bitstream to retrieve syntax information, e.g., syntax elements, for a plurality of layers of video data, that are constrained as described herein. Prediction processing unit 281 and summer 290 may reconstruct respective pictures in the layers based on the constrained syntax information, e.g., based on the partitioning of the pictures in the numbers of tiles and LCUs having LCU sizes, as described herein.

In this manner, video decoder 30 is an example of a video decoder configured to perform a method for decoding video data comprising a plurality of layers comprises decoding respective syntax information for each layer of the plurality of layers of the video data. The respective syntax information for each layer of the plurality of layers defines partitioning of a picture in the layer into a number of tiles per picture for the layer. The syntax information is constrained such that the number of tiles per picture for each layer of the plurality of layers is determined based on a maximum number of tiles per picture for the layer. The maximum number of tiles per picture for the layer is determined based on at least one of a spatial resolution, tier information, or level information for the picture in the layer. The method further comprises reconstructing the picture in the at least one layer based on the partitioning of the picture into the number of tiles per picture for the layer defined by the decoded syntax information. In some examples, the maximum number of tiles per picture for the layer is determined to be a maximum number of tiles per picture for a lowest bitstream level that allows the spatial resolution for the layer. In some examples, the syntax information is constrained such that the number of tiles per picture for each layer of the plurality of layers is no greater than the maximum number of tiles per picture for the layer.

In some examples, the syntax information is constrained such that a sum of the numbers of tiles per picture for the plurality of layers is no greater than a sum of the maximum numbers of tiles per picture for the plurality of layers. In some examples the syntax information is constrained such that the number of tiles per picture for a first layer of the plurality of layers is greater than a maximum number of tiles per picture for the first layer, and the number of tiles per picture for a second layer of the plurality of layers is less than a maximum number of tiles per picture for the second layer. In some examples, the respective syntax information for each layer of the plurality of layers comprises respective values of a first syntax element defining a number of tile columns per picture and a second syntax element defining a number of tile rows per picture, and the maximum number of tiles per picture for each layer of the plurality of layers is defined by a maximum number of tile columns per picture and a maximum number of tile rows per picture for each layer of the plurality of layers. In some examples, the syntax information is constrained such that the number of tile columns per picture for one layer of the plurality of layers is no greater than a sum of the maximum number of tile columns per picture for the layer and a number of remaining tile columns per picture for the layer, and the number of tile rows per picture for the layer is no greater than a sum of the maximum number of tile rows per picture for the layer and a number of remaining of tile rows per picture for the layer. In some examples, the number of remaining tile columns per picture for the layer comprises a sum of differences between the maximum number of tile columns per picture and the number of tile columns per picture for one or more other layers of the plurality of layers, and the number of remaining tile rows per picture for the layer comprises a sum of differences between the maximum number of tile rows per picture and the number of tile rows per picture for the one or more other layers of the plurality of layers.

In some examples, an apparatus for decoding video data comprising a plurality of layers comprises a memory configured to store an encoded video bitstream that encodes the video data, and one or more processors. The one or more processors are configured to decode respective syntax information for each layer of the plurality of layers of the video data from the encoded video bitstream, the respective syntax information for each layer of the plurality of layers defining partitioning of a picture in the layer into a number of tiles per picture for the layer. The syntax information is constrained such that the number of tiles per picture for each layer of the plurality of layers is determined based on a maximum number of tiles per picture for the layer. The maximum number of tiles per picture for the layer is determined based on at least one of a spatial resolution, tier information, or level information for the picture in the layer. The one or more processors are further configured to reconstruct the picture in the at least one layer based on the partitioning of the picture into the number of tiles for the layer defined by the decoded syntax information.

Figure 15:
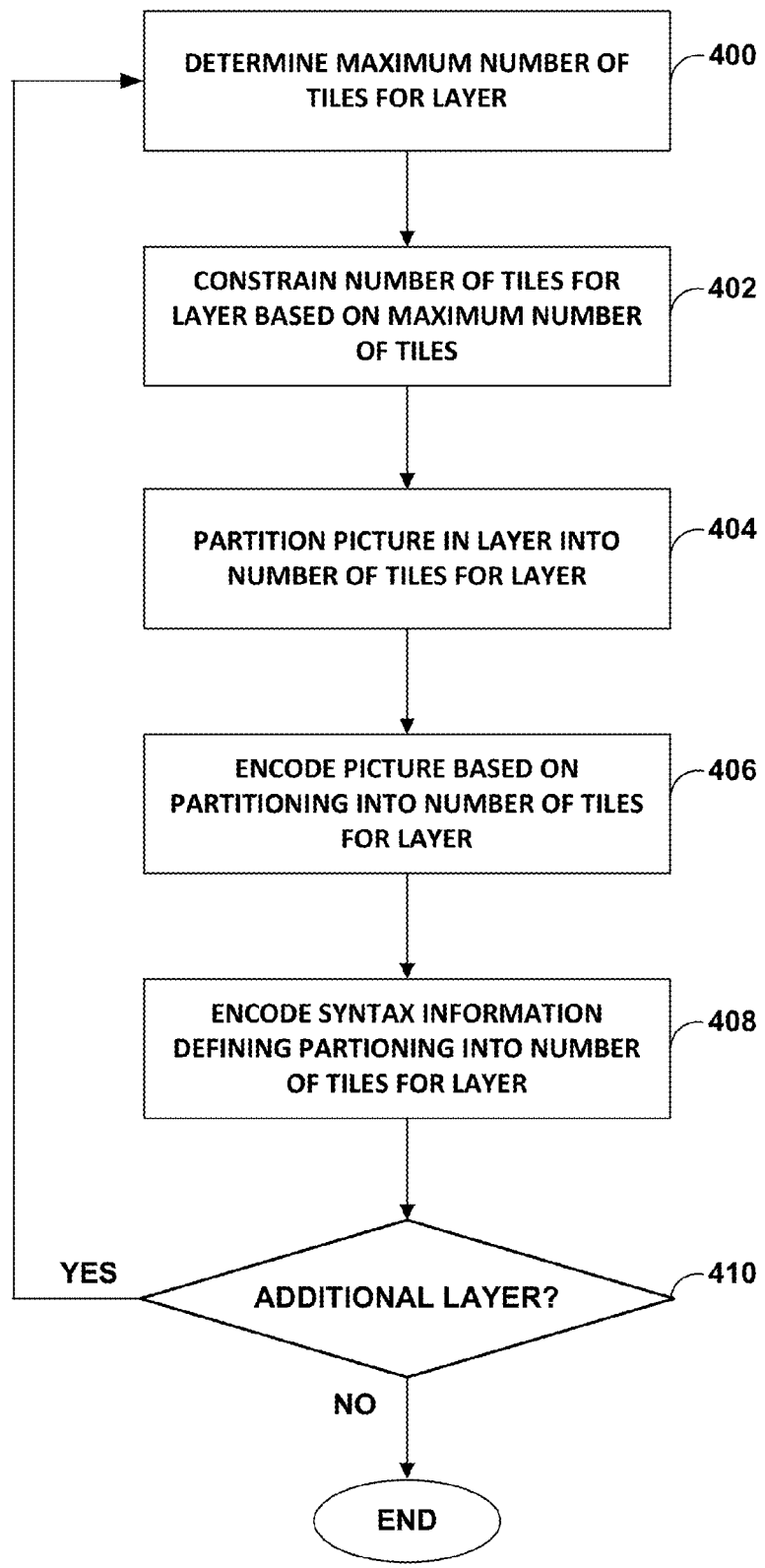
FIG. 15 is a flow diagram illustrating an example method for partitioning pictures in a plurality of layers into numbers of tiles and encoding a video bitstream according to the techniques described in this disclosure.

FIG. 15 is a flow diagram illustrating an example method for partitioning pictures in a plurality of layers into numbers of tiles and encoding a video bitstream according to the techniques described in this disclosure. The example method of FIG. 15 may be performed by a video encoder, such as video encoder 20.

According to the example method of FIG. 15, the video encoder determines a maximum number of tiles per picture for a layer of the plurality of layers, e.g., based on a spatial resolution and/or tier and level information for the layer (400). For example, the video encoder may determine the maximum number of tiles per picture for a lowest bitstream level that supports the resolution for layer, e.g., as specified in Table A-1 of the HEVC specification. The video encoder 20 constrains a number of tiles per picture for the layer based on the maximum number of tiles (402). For example, the video encoder may constrain the number of tiles per picture for the layer to be no greater than the maximum number of tiles per picture for the layer.

The video encoder may partition the picture in the layer into the number of tiles per picture, as constrained based on the maximum number of tiles per picture for the layer (404). The video encoder encodes the picture in the layer based on the partitioning of the picture into the number of tiles per picture for the layer (406). The video encoder also encodes syntax information defining the partitioning of the picture into the number of tiles for the layer, e.g., encodes PPSs indicating numbers of tile rows and numbers of tile columns for the layer, and encodes syntax information in a slice heading indicating which PPS, and thus which number of tile rows and number of tile columns for the layer, is active. If there is an additional layer of video data (YES of 410), the video encoder may again determine the maximum number of tiles per picture, constrain the number of tiles per picture, partition the picture, encode the picture, and encode syntax information for the layer (400-408). Otherwise, the example method of FIG. 15 may end (NO of 410).

Figure 16:
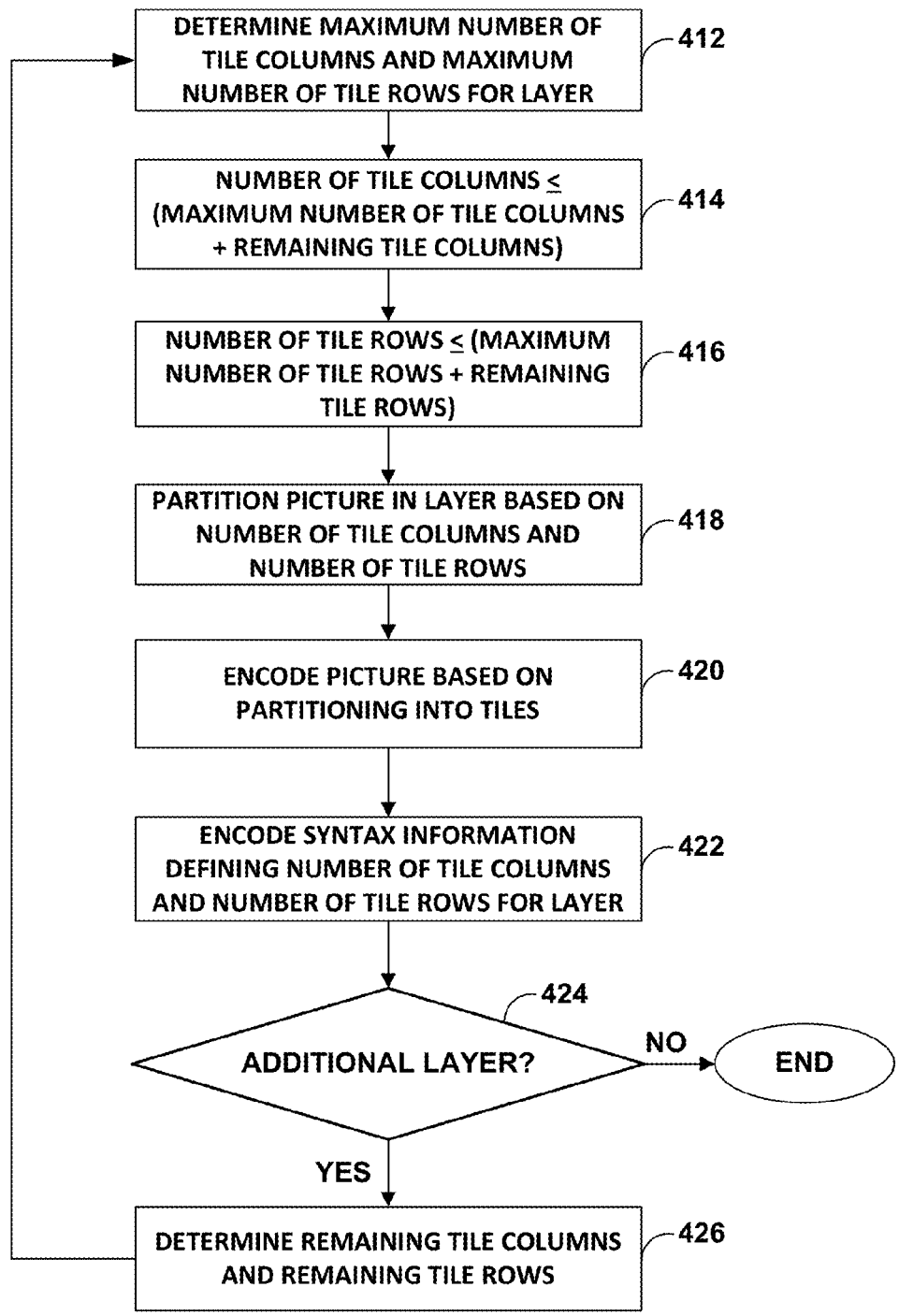
FIG. 16 is a flow diagram illustrating another example method for partitioning pictures in a plurality of layers into numbers of tiles and encoding a video bitstream according to techniques described in this disclosure.

FIG. 16 is a flow diagram illustrating another example method for partitioning pictures in a plurality of layers into numbers of tiles and encoding a video bitstream according to techniques described in this disclosure. The example method of FIG. 16 may be performed by a video encoder, such as video encoder 20.

According to the example method of FIG. 16, the video encoder determines a maximum number of tile columns and a maximum number of tile rows per picture for a layer among of plurality of layers of video data, e.g., based on a spatial resolution and/or tier and level information for a picture in the layer (412). For example, the video encoder may determine the maximum number of tiles per picture for a lowest bitstream level that supports the resolution for layer, e.g., as specified in Table A-1 of the HEVC specification. The video encoder constrains a number of tile columns per picture for the layer to be no greater than a sum of the maximum number of tile columns per picture for the layer and a number of remaining tile columns (414). The video encoder also constrain the number of tile rows per picture for the layer to be no greater than a sum of the maximum number of tile rows per picture for the layer and a number of remaining tile rows for the layer (416). As described herein, the remaining number of tile columns may be an accumulation, or sum, of differences between the actual number of tile columns per picture and the maximum number of tile columns per picture for one or more other layers of the plurality of layers. Similarly, the remaining number of tile rows may be an accumulation, or sum, of differences between the actual number of tile rows per picture and the maximum number of tile rows per picture for one or more other layers of the plurality of layers.

The video encoder partitions the picture in the layer into a number of tiles per picture based on the number of tile columns and the number of tile rows per picture, as constrained (418). The video encoder encodes the picture in the layer based on the partitioning into tiles (420). The video encoder also encodes syntax information defining the number of tile columns and the number of tile rows per picture for the layer (422). For example, the video encoder may encode PPSs indicating numbers of tile rows and numbers of tile columns per picture for the layer, and encodes syntax information in a slice heading indicating which PPS, and thus which number of tile rows and number of tile columns for the layer, is active.

If there is an additional layer of video data (YES of 424), the video encoder may determine the remaining tile columns and remaining tile rows (426). For example, the video encoder may determine the differences between the actual numbers of tile columns and tile rows per picture, and the maximum numbers of tile columns and tile rows per picture, and accordingly increment or decrement the remaining numbers of tile columns and tile rows. Video encoder may then again determine the maximum numbers of tile columns and rows per picture, constrain the numbers of tile columns and rows per picture, partition the picture, encode the picture, and encode syntax information for the layer (412-422). Otherwise, the example method of FIG. 16 may end (NO of 410).

Figure 17:
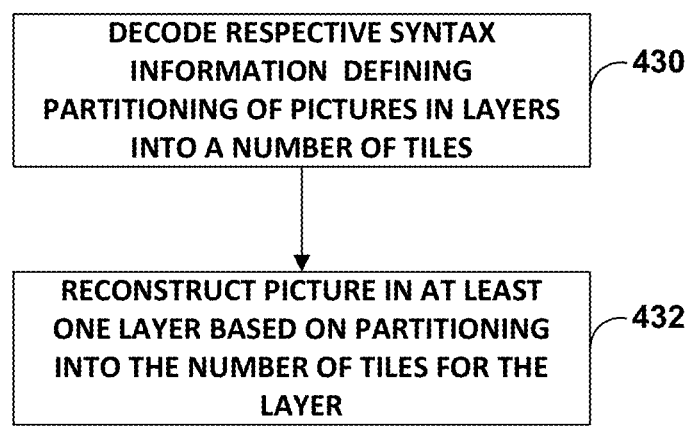
FIG. 17 is a flow diagram illustrating an example method for reconstructing a picture that was partitioned into a number of tiles for a layer.

FIG. 17 is a flow diagram illustrating an example method for reconstructing a picture that was partitioned into a number of tiles per picture for a layer. The example method of FIG. 17 may be performed by a video decoder, such as video decoder 30.

According to the example method of FIG. 17, the video decoder decodes respective syntax information for a plurality of layers defining partitioning of a picture in the layer into a number of tiles per picture for the layer (430). For example, the video decoder may decode syntax information in a slice header identifying an active PPS for the picture of the layer, and the active PPS, which may have been previously decoded by the video decoder, may indicate a number of tile columns and a number of tile rows per picture for the layer. The video decoder may also reconstruct the picture of at least one of the plurality of layers based on the partitioning of the picture into the number of tiles per picture for the layer (432). As described herein, the syntax information may be constrained, e.g., the number of tiles per picture for the layer may be constrained to be no greater than a maximum number of tiles per picture for the layer, or no greater than a maximum number of tiles per picture for the layer and a remaining number of tiles.

Figure 18:
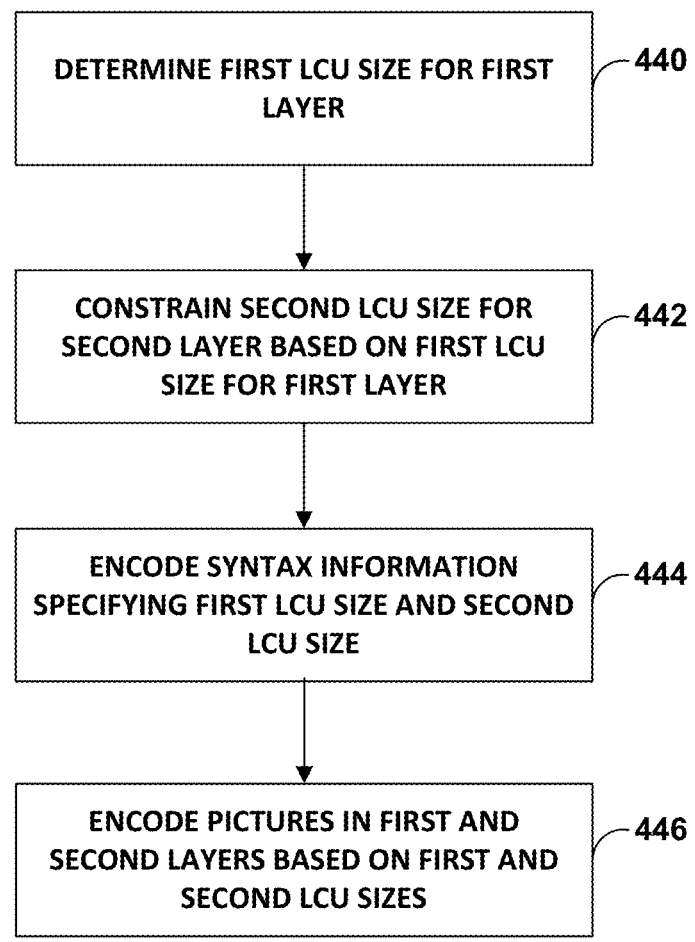
FIG. 18 is a flow diagram illustrating an example method for constraining LCU size and encoding a video bitstream according to the techniques described in this disclosure.

FIG. 18 is a flow diagram illustrating an example method for constraining LCU size and encoding a video bitstream according to the techniques described in this disclosure. The example method of FIG. 18 may be performed by a video encoder, such as video encoder 20.

According to the example method of FIG. 18, the video encoder determines a first LCU size for a first layer of video data (440). The video encoder constrains a second LCU size for a second layer of the video data based on the first LCU size for the first layer of video data (442). In some examples, the video encoder constrains the second LCU size to be the same as the first LCU size. In some examples, the first layer is an active reference layer for the second layer, e.g., for SNR scalability. In some examples, pictures in the first and second layers have the same spatial resolution.

The video encoder also encodes syntax information into an encoded video bitstream that specifies the first and second LCU sizes for the first and second layers (444). For example, the video encoder may encode an SPS specifying the LCU sizes for the first and second layers, and may encode syntax information, e.g., in a slice header, indicating that the SPS is active. The video encoder may also encode pictures in the first and second layers into the video bitstream based on the first and second LCU sizes (446).

Figure 19:
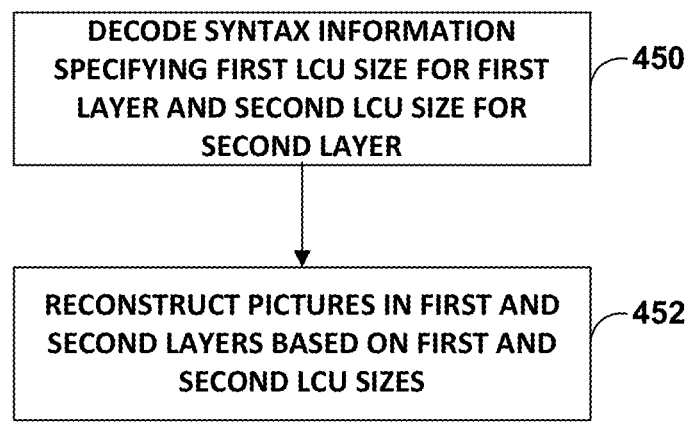
FIG. 19 is a flow diagram illustrating an example method reconstructing pictures in a plurality of layers with constrained LCU sizes.

FIG. 19 is a flow diagram illustrating an example method reconstructing pictures in a plurality of layers with constrained LCU sizes. The example method of FIG. 19 may be performed by a video decoder, such as video decoder 30.

According to the example method of FIG. 19, the video decoder decodes syntax information specifying a first LCU size for a first layer and a second LCU size for a second layer (450). For example, the video decoder may decode syntax information identifying an active SPS for the layer, and the active SPS, which may have been previously decoded by the video decoder, may indicate the first and second LCU sizes. The video decoder may reconstruct pictures in the first and second layers based on the first and second LCU sizes (452). As described herein, the second LCU size may be constrained based on, e.g. to be equal to, the first LCU size. The first layer may be an active reference layer, e.g., for SNR scalability, for the second layer. In some examples, pictures in the first and second layers have the same spatial resolution.

In some examples, one or more aspects of the techniques described in this disclosure may be performed by an intermediate network device such as a media aware network element (MANE), a stream adaptation processor, a splicing processor, or an editing processor. For example, such an intermediate device may be configured to generate or receive any of a variety signaling as described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g. according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g. a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data comprising a plurality of layers, the method comprising:
    decoding respective syntax information for each layer of the plurality of layers of the video data, the respective syntax information for each layer of the plurality of layers defining partitioning of a picture in the layer into a number of tiles per picture for the layer, wherein the syntax information is constrained such that the number of tiles per picture for each layer of the plurality of layers is determined based on a maximum number of tiles per picture for the layer, wherein the maximum number of tiles per picture for the layer is determined based on at least one of a spatial resolution, tier information, or level information for the picture in the layer; and
    reconstructing the picture in the at least one layer based on the partitioning of the picture into the number of tiles per picture for the layer defined by the decoded syntax information.

2. The method of claim 1, wherein the respective syntax information for each layer of the plurality of layers comprises respective values of a first syntax element defining a number of tile columns per picture and a second syntax element defining a number of tile rows per picture, and wherein the maximum number of tiles per picture for each layer of the plurality of layers is defined by a maximum number of tile columns per picture and a maximum number of tile rows per picture for each layer of the plurality of layers.

3. The method of claim 1, wherein the maximum number of tiles per picture for the layer is determined to be a maximum number of tiles per picture for a lowest bitstream level that allows the spatial resolution for the layer.

4. The method of claim 1, wherein the syntax information is constrained such that the number of tiles per picture for each layer of the plurality of layers is no greater than the maximum number of tiles per picture for the layer.

5. The method of claim 1, wherein the syntax information is constrained such that a sum of the numbers of tiles per picture for the plurality of layers is no greater than a sum of the maximum numbers of tiles per picture for the plurality of layers.

6. The method of claim 5, wherein the syntax information is constrained such that the number of tiles per picture for a first layer of the plurality of layers is greater than a maximum number of tiles per picture for the first layer, and the number of tiles per picture for a second layer of the plurality of layers is less than a maximum number of tiles per picture for the second layer.

7. The method of claim 5, wherein an access unit comprises the respective picture within each of the plurality of layers.

8. The method of claim 5, wherein the plurality of layers comprise a plurality of layers of a sub-bitstream.

9. The method of claim 5,
    wherein the respective syntax information for each layer of the plurality of layers comprises respective values of a first syntax element defining a number of tile columns per picture and a second syntax element defining a number of tile rows per picture, wherein the maximum number of tiles per picture for each layer of the plurality of layers is defined by a maximum number of tile columns per picture and a maximum number of tile rows per picture for each layer of the plurality of layers, wherein syntax information is constrained such that the number of tile columns per picture for one layer of the plurality of layers is no greater than a sum of the maximum number of tile columns per picture for the layer and a number of remaining tile columns per picture for the layer, and the number of tile rows per picture for the layer is no greater than a sum of the maximum number of tile rows per picture for the layer and a number of remaining of tile rows per picture for the layer, and wherein the number of remaining tile columns per picture for the layer comprises a sum of differences between the maximum number of tiles columns per picture and the number of tile columns per picture for one or more other layers of the plurality of layers, and the number of remaining tile rows per picture for the layer comprises a sum of differences between the maximum number of tile rows per picture and the number of tile rows per picture for the one or more other layers of the plurality of layers.

10. The method of claim 9, wherein the one layer of the plurality of layers is a non-base layer.

11. The method of claim 1, wherein the video data comprises scalable video coding data, and the plurality of layers comprise scalable video coding layers.

12. The method of claim 1, wherein the video data comprises multi-view video data, and the plurality of layers correspond to a plurality of views of the multi-view video data.

13. The method of claim 1, wherein decoding the syntax information comprises determining an active parameter set that includes the syntax information.

14. The method of claim 13, wherein the active parameter set comprises an active picture parameter set.

15. A method of encoding video data comprising a plurality of layers, the method comprising:
  partitioning a picture in each layer of the plurality of layers of the video data into a number of tiles per picture for the layer, wherein partitioning the picture into the number of tiles per picture for each of the layers comprises:
    determining a maximum number of tiles per picture for the layer based on at least one of a spatial resolution, tier information, or level information for the picture in the layer; and
    constraining the number of tiles per picture for the layer based on the maximum number of tiles per picture for the layer;
  encoding the picture in each layer of the plurality of layers based on the partitioning of the picture into the number of tiles per picture for the layer; and
  encoding respective syntax information for each layer of the plurality of layers of the video data, the respective syntax information for each layer of the plurality of layers defining the partitioning of the picture in the layer into the number of tiles per picture for the layer.

16. The method of claim 15, wherein the respective syntax information for each layer of the plurality of layers comprises respective values of a first syntax element defining a number of tile columns per picture and a second syntax element defining a number of tile rows per picture, and wherein the maximum number of tiles per picture for each layer of the plurality of layers is defined by a maximum number of tile columns per picture and a maximum number of tile rows per picture for each layer of the plurality of layers.

17. The method of claim 15, wherein determining the maximum number of tiles per picture for the layer comprises determining a maximum number of tiles for a lowest bitstream level that allows the spatial resolution for the layer.

18. The method of claim 15, wherein constraining the number of tiles per picture for the layer based on the maximum number of tiles per picture for the layer comprises constraining the number of tiles per picture for each layer of the plurality of layers to be no greater than the maximum number of tiles per picture for the layer.

19. The method of claim 15, wherein constraining the number of tiles per picture for the layer based on the maximum number of tiles per picture for the layer comprises constraining the number of tiles per picture for each layer of the plurality of layers such that a sum of the numbers of tiles per picture for the plurality of layers is no greater than a sum of the maximum numbers of tiles per picture for the plurality of layers.

20. The method of claim 19, wherein constraining the number of tiles per picture for the layer based on the maximum number of tiles per picture for the layer comprises constraining the number of tiles for each layer of the plurality of layers such that the number of tiles per picture for a first layer of the plurality of layers is greater than a maximum number of tiles per picture for the first layer, and the number of tiles per picture for a second layer of the plurality of layers is less than a maximum number of tiles per picture for the second layer.

21. The method of claim 19, wherein an access unit comprises the respective picture within each of the plurality of layers.

22. The method of claim 19, wherein the plurality of layers comprise a plurality of layers of a sub-bitstream.

23. The method of claim 19,
  wherein the respective syntax information for each layer of the plurality of layers comprises respective values of a first syntax element defining a number of tile columns per picture and a second syntax element defining a number of tile rows per picture,
  wherein the maximum number of tiles per picture for each layer of the plurality of layers is defined by a maximum number of tile columns per picture and a maximum number of tile rows per picture for each layer of the plurality of layers, and
  wherein constraining the number of tiles per picture for the layer based on the maximum number of tiles per picture for the layer comprises constraining the number of tiles per picture for each layer of the plurality of layers such that the number of tile columns per picture for one layer of the plurality of layers is no greater than a sum of the maximum number of tile columns per picture for the layer and a number of remaining tile columns per picture for the layer, and the number of tile rows for the layer is no greater than a sum of the maximum number of tile rows per picture for the layer and a number of remaining of tile rows per picture for the layer, the method further comprising:
    determining a sum of differences between the maximum number of tile columns per picture and the number of tile columns per picture for one or more other layers of the plurality of layers as the number of remaining tile columns per picture for the layer; and determining a sum of differences between the maximum number of tile rows per picture and the number of tile rows per picture for the one or more other layers of the plurality of layers as the number of remaining tile rows per picture for the layer.

24. The method of claim 23, wherein the one layer of the plurality of layers is a non-base layer.

25. The method of claim 15, wherein the video data comprises scalable video coding data, and the plurality of layers comprise scalable video coding layers.

26. The method of claim 15, wherein the video data comprises multi-view video data, and the plurality of layers correspond to a plurality of views of the multi-view video data.

27. The method of claim 15, wherein encoding the syntax information comprises encoding information that identifies an active parameter set that includes the syntax information.

28. The method of claim 27, wherein the active parameter set comprises an active picture parameter set.

29. An apparatus comprising a video decoder configured decode video data comprising a plurality of layers, the video decoder comprising:

a memory configured to store an encoded video bitstream that encodes the video data; and one or more processors configured to:

decode respective syntax information for each layer of the plurality of layers of the video data, the respective syntax information for each layer of the plurality of layers defining partitioning of a picture in the layer into a number of tiles per picture for the layer, wherein the syntax information is constrained such that the number of tiles per picture for each layer of the plurality of layers is determined based on a maximum number of tiles per picture for the layer, wherein the maximum number of tiles per picture for the layer is determined based on at least one of a spatial resolution, tier information, or level information for the picture in the layer; and reconstruct the picture in the at least one layer based on the partitioning of the picture into the number of tiles per picture for the layer defined by the decoded syntax information.

30. The apparatus of claim 29, wherein the maximum number of tiles per picture for the layer is determined to be a maximum number of tiles per picture for a lowest bitstream level that allows the spatial resolution for the layer.

31. The apparatus of claim 29, wherein the syntax information is constrained such that the number of tiles per picture for each layer of the plurality of layers is no greater than the maximum number of tiles per picture for the layer.

32. The apparatus of claim 29, wherein syntax information is constrained such that a sum of the numbers of tiles per picture for the plurality of layers is no greater than a sum of the maximum numbers of tiles per picture for the plurality of layers.

33. The apparatus of claim 32, wherein the respective syntax information for each layer of the plurality of layers comprises respective values of a first syntax element defining a number of tile columns per picture and a second syntax element defining a number of tile rows per picture, wherein the maximum number of tiles per picture for each layer of the plurality of layers is defined by a maximum number of tile columns per picture and a maximum number of tile rows per picture for each layer of the plurality of layers, wherein syntax information is constrained such that the number of tile columns per picture for one layer of the plurality of layers is no greater than a sum of the maximum number of tile columns per picture for the layer and a number of remaining tile columns per picture for the layer, and the number of tile rows per picture for the layer is no greater than a sum of the maximum number of tile rows per picture for the layer and a number of remaining of tile rows per picture for the layer, and wherein the number of remaining tile columns per picture for the layer comprises a sum of differences between the maximum number of tiles columns per picture and the number of tile columns per picture for one or more other layers of the plurality of layers, and the number of remaining tile rows per picture for the layer comprises a sum of differences between the maximum number of tile rows per picture and the number of tile rows per picture for the one or more other layers of the plurality of layers.

34. The apparatus of claim 29, wherein the apparatus comprises one of:

a microprocessor;

an integrated circuit (IC); and a wireless communication device comprising at least one of the video decoder.

35. An apparatus comprising a video encoder configured encode video data comprising a plurality of layers, the video encoder comprising:

a memory configured to store an encoded video bitstream that encodes the video data; and one or more processors configured to:

partition a picture in each layer of the plurality of layers of the video data into a number of tiles per picture for the layer, wherein, to partition the picture into the number of tiles, the one or more processors are configured to:

determine a maximum number of tiles per picture for the layer based on at least one of a spatial resolution, tier information, or level information for the picture in the layer; and constrain the number of tiles per picture for the layer based on the maximum number of tiles per picture for the layer;

encode, into the encoded video bitstream, the picture in each layer of the plurality of layers based on the partitioning of the picture into the number of tiles per picture for the layer; and encode, into the encoded video bitstream, respective syntax information for each layer of the plurality of layers of the video data, the respective syntax information for each layer of the plurality of layers defining the partitioning of the picture in the layer into the number of tiles per picture for the layer.

36. The apparatus of claim 35, wherein, to determine the maximum number of tiles per picture for the layer, the one or more processors are configured to determine a maximum number of tiles per picture for a lowest bitstream level that allows the spatial resolution for the layer.

37. The apparatus of claim 35, wherein the one or more processors are configured to constrain the number of tiles per picture for each layer of the plurality of layers to be no greater than the maximum number of tiles per picture for the layer.

38. The apparatus of claim 35, wherein the one or more processors are configured to constrain the number of tiles per picture for each layer of the plurality of layers such that a sum of the numbers of tiles per picture for the plurality of layers is no greater than a sum of the maximum numbers of tiles per picture for the plurality of layers.

39. The apparatus of claim 38,
wherein the respective syntax information for each layer of the plurality of layers comprises respective values of a first syntax element defining a number of tile columns per picture and a second syntax element defining a number of tile rows per picture,
wherein the maximum number of tiles per picture for each layer of the plurality of layers is defined by a maximum number of tile columns per picture and a maximum number of tile rows per picture for each layer of the plurality of layers,
wherein constraining the number of tiles per picture for the layer based on the maximum number of tiles per picture for the layer comprises constraining the number of tiles per picture for each layer of the plurality of layers such that the number of tile columns per picture for one layer of the plurality of layers is no greater than a sum of the maximum number of tile columns per picture for the layer and a number of remaining tile columns per picture for the layer, and the number of tile rows per picture for the layer is no greater than a sum of the maximum number of tile rows per picture for the layer and a number of remaining of tile rows per picture for the layer, and
wherein the one or more processors are configured to:
determine a sum of differences between the maximum number of tile columns per picture and the number of tile columns per picture for one or more other layers of the plurality of layers as the number of remaining tile columns per picture for the layer; and
determine a sum of differences between the maximum number of tile rows per picture and the number of tile rows per picture for the one or more other layers of the plurality of layers as the number of remaining tile rows per picture for the layer.

40. The apparatus of claim 35, wherein the apparatus comprises one of:
a microprocessor;
an integrated circuit (IC); and
a wireless communication device comprising at least one of the video encoder.

41. An apparatus configured to code video data comprising a plurality of layers, the apparatus comprising:
means for coding respective syntax information for each layer of the plurality of layers of the video data, the respective syntax information for each layer of the plurality of layers defining partitioning of a picture in the layer into a number of tiles per picture for the layer, wherein the syntax information is constrained such that the number of tiles per picture for each layer of the plurality of layers is determined based on a maximum number of tiles per picture for the layer, wherein the maximum number of tiles per picture for the layer is determined based on at least one of a spatial resolution, tier information, or level information for the picture in the layer; and
means for processing the picture in the at least one layer based on the partitioning of the picture into the number of tiles per picture for the layer defined by the coded syntax information.

42. A non-transitory computer-readable storage medium having instructions stored thereon that when executed cause one or more processors of a video coder to:
code respective syntax information for each layer of the plurality of layers of the video data, the respective syntax information for each layer of the plurality of layers defining partitioning of a picture in the layer into a number of tiles per picture for the layer, wherein the syntax information is constrained such that the number of tiles per picture for each layer of the plurality of layers is determined based on a maximum number of tiles per picture for the layer, wherein the maximum number of tiles per picture for the layer is determined based on at least one of a spatial resolution, tier information, or level information for the picture in the layer; and
process the picture in the at least one layer based on the partitioning of the picture into the number of tiles per picture for the layer defined by the coded syntax information.

* * * * *